United States Patent [19]

Kusaka

[11] Patent Number: 5,311,004
[45] Date of Patent: May 10, 1994

[54] FOCUS DETECTING APPARATUS WITH GAZE DETECTION AND FOCUS AREA CHANGING

[75] Inventor: Yosuke Kusaka, Yokohama, Japan

[73] Assignee: Nikon Corporation, Tokyo, Japan

[21] Appl. No.: 91,084

[22] Filed: Jul. 14, 1993

Related U.S. Application Data

[63] Continuation of Ser. No. 954,401, Oct. 5, 1992, abandoned.

[30] Foreign Application Priority Data

Oct. 17, 1991 [JP] Japan ................................ 3-298520

[51] Int. Cl.$^5$ .............................................. G01J 1/20
[52] U.S. Cl. .................................... 250/201.8; 354/408
[58] Field of Search .............. 250/201.2, 201.6, 201.7, 250/201.8; 354/406, 407, 408; 356/1, 4

[56] References Cited

U.S. PATENT DOCUMENTS 5,160,834 11/1992 Moriyama ..................... 250/201.8

FOREIGN PATENT DOCUMENTS 63-11906  1/1988  Japan .
63-98613  4/1988  Japan .
2-217811  8/1990  Japan .

*Primary Examiner*—David C. Nelms
*Attorney, Agent, or Firm*—Shapiro and Shapiro

[57] ABSTRACT

A focus detecting apparatus capable of changing a focus detecting region in a photographing image field by the use of a set of focus detecting optical systems and a pair of sensor light receiving portions is provided with a focus detecting optical system for setting the focus detecting region on the predetermined focal plane of a phototaking optical system, directing a light beam from an object passed through the focus detecting region to photoelectric converting means fixed at a predetermined location, and forming an object image, region changing means provided in the optical path from the focus detecting region to the photoelectric converting means for changing the focus detecting region on the predetermined focal plane, and calculating means for calculating the focus adjusted state of the phototaking optical system in the focus detecting region after changed by the region changing means, on the basis of the output signal of the photoelectric converting means.

26 Claims, 21 Drawing Sheets

FOCUS DETECTING APPARATUS WITH GAZE DETECTION AND FOCUS AREA CHANGING

This is a continuation of application Ser. No. 956,401 filed Oct. 5, 1992, now abandoned.

BACKGROUND OF THE INVENTION

1. Field of the Invention

This invention relates to a focus detecting apparatus in which a focus detecting region can be changed.

2. Related Background Art

A focus detecting apparatus having a plurality of focus detecting regions in a photographing image field is known (see, for example, Japanese Laid-Open Patent Application No. 63-11906).

In a focus detecting apparatus of this kind, a plurality of focus detecting regions are set in a range corresponding to a photographing image field on a predetermined focal plane, and a plurality of focus detecting optical systems and a plurality of pairs of sensor light receiving portions are provided corresponding to the respective focus detecting regions.

By the focus detecting optical system corresponding to each focus detecting region, a light beam from an object passed through each resion is directed to the pair of sensor light receiving portions corresponding to each region, and on the basis of the output signals of those sensor light receiving portions, the focus adjusted state of a phototaking optical system in each focus detecting region is detected.

However, the above-described focus detecting apparatus suffers from the following problems:

(1) A focus detecting module comprising a plurality of focus detecting optical systems and a plurality of pairs of sensor light receiving portions must be provided correspondingly to a plurality of focus detecting regions and therefore, the cost of the apparatus becomes high.

(2) Since installation space for the large focus detecting module must be secured, the downsizing of the apparatus is difficult.

(3) The plurality of focus detecting regions are fixed in their positional relation with the corresponding focus detecting optical systems and the pairs of sensor light receiving portions and the positions of the focus detecting regions cannot be arbitrarily changed.

(4) It is necessary to dispose the focus detecting regions in suitably spaced apart relationship with one another so that the plurality of focus detecting optical systems and the plurality of pairs of sensor light receiving portions may not interfere with one another, and the focus detecting regions cannot be set at arbitrary positions.

In order to solve such problems, in a focus detecting apparatus disclosed in Japanese Laid-Open Patent Application No. 2-217811, a light beam passed through a phototaking optical system is reflected by a sub-mirror in a camera body and is directed to a focus detecting module provided at the bottom of the camera body and also, the angle of the sub-mirror is varied to thereby change the focus detecting region.

Again in this focus detecting apparatus, however, the above-noted problems are not completely solved, but there are the following problems:

(1) The position and angle, in the direction of the optical axis, of the focus detecting module with respect to a predetermined focal plane deviate due to a change in the angle of the sub-mirror and therefore, focus detection accuracy is reduced.

(2) In the method of changing the angle of the sub-mirror, the focus detecting region can be changed only in the longitudinal direction of the photographing image field.

(3) When the focus detecting region is changed by changing the angle of the sub-mirror, it is necessary to set the angle of the sub-mirror within such a range that the positional relation of the focus detecting module to the predetermined focal plane does not greatly deviate, and the position of the focus detecting region cannot be greatly changed.

Now, it is conceivable to move a focus detecting module itself comprising a focus detecting optical system and a pair of sensor light receiving portions in a plane parallel to a predetermined focal plane to thereby change the focus detecting region.

However, this method would suffer from the following problems:

(1) It is difficult to move the focus detecting module exactly in a plane parallel to the predetermined focal plane and if the position deviates in the direction of the optical axis of a phototaking optical system, the amount of the deviation will provide a focus detection error.

(2) It is necessary to secure a space in which the entire focus detecting module is moved and moreover, a driving mechanism must be provided and thus, the apparatus becomes bulky.

(3) Each time the sensor light receiving portions are moved with the movement of the focus detecting module, stress is applied to a wiring material connected to the sensor light receiving portions and therefore, the connecting portions may come off or the wiring material may be cut.

SUMMARY OF THE INVENTION

It is an object of the present invention to provide a focus detecting apparatus which can change a focus detecting region in a photographing image field by the use of a set of focus detecting optical systems and a pair of sensor light receiving portions.

The above and other objects of the present invention will become apparent from the following detailed description taken in conjunction with the accompanying drawings and appended claims.

DESCRIPTION OF THE PREFERRED EMBODIMENTS

Figure 1:
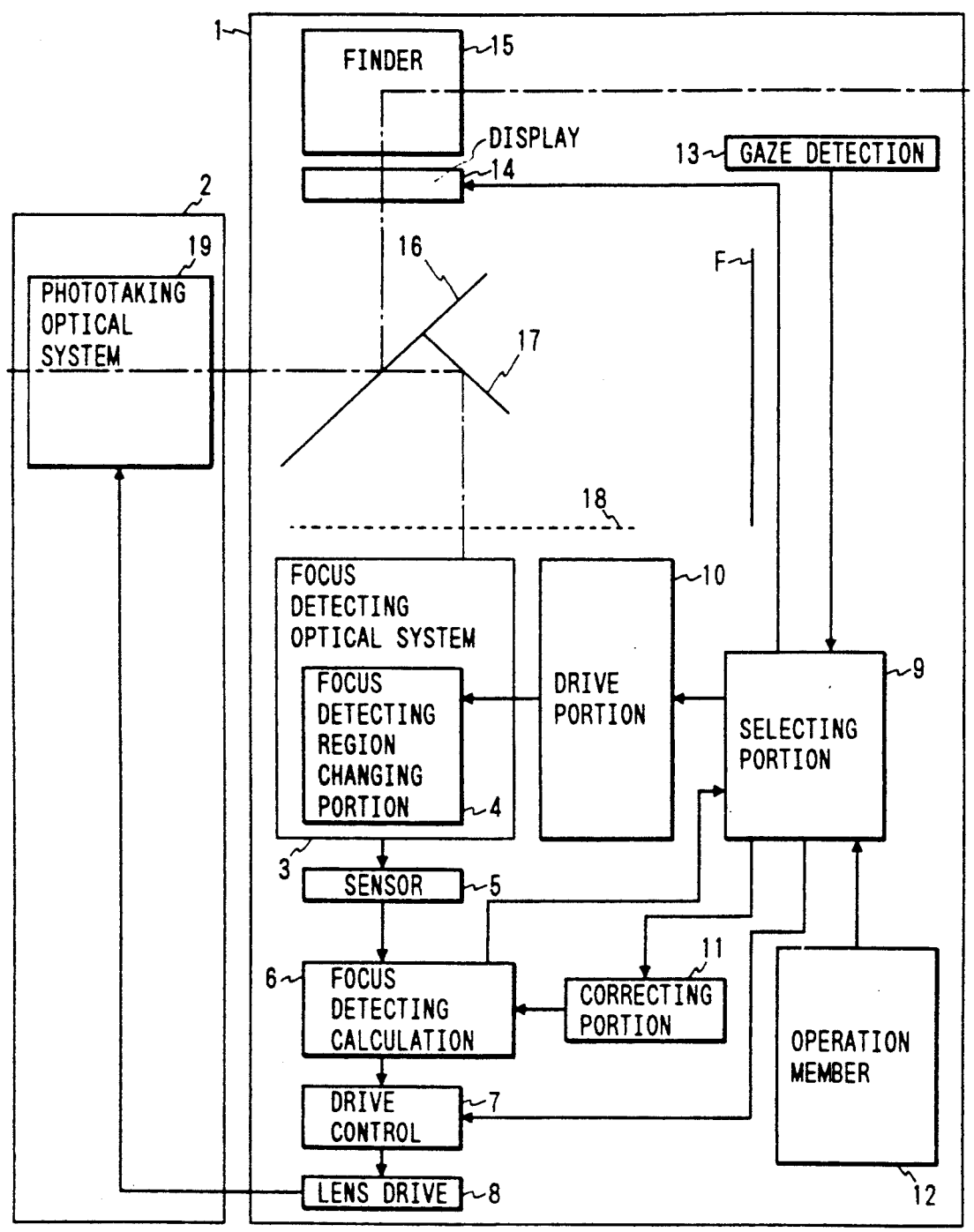
FIG. 1 is a block diagram showing the construction of an embodiment of the present invention.

FIG. 1 is a block diagram showing the construction of an embodiment of the present invention.

A lens 2 is interchangeably designed relative to a camera body 1, and FIG. 1 shows a state in which the lens 2 is mounted on the camera body.

A light beam from an object passing through a phototaking optical system 19 is divided into light beams travelling toward a finder 15 and a sub-mirror 17, respectively, by a main mirror 16 comprised of a half mirror.

A display portion 14 is disposed in a finder optical path, and effects the display of a focus detecting region and the focus state as it is superimposed on a finder image.

The light beam further deflected toward the bottom of the camera body by the sub-mirror 17 is directed to a focus detecting optical system 3, a focus detecting region changing portion 4 and a sensor 5 which are disposed near the predetermined focal plane 18 of the phototaking optical system 19 as will be described later.

The sensor 5 effects charge accumulation for a charge accumulation time conforming to the luminance of the object, and a photoelectrically converted object image signal is sent to a focus detecting calculation portion 6. The object image signal is calculation-processed by the focus detecting calculation portion 6, and the defocus amount between the imaging plane and the predetermined focal plane 18 of the phototaking optical system 19 is calculated.

A drive control portion 7 controls the direction and amount of driving of a lens drive portion 8 on the basis of the calculated defocus amount. The lens drive portion 8 is mechanically coupled to the photo-taking optical system 19, and the amount and speed of driving thereof are controlled, whereby the photo-taking optical system 19 is moved to an in-focus position.

A gaze detection portion 13 is means for detecting at which portion of the finder image field the photographer is gazing.

An operation member 12 is means for the photographer to manually change the focus detecting region.

A selecting portion 9 effects the selection of the focus detecting region on the basis of the output of the focus detecting calculation portion 6, the operation member 12 or the gaze detection portion 13 and effects control for changing the region.

A drive portion 10 effects the driving of a moving member included in the focus detecting region changing portion 4 to change the focus detecting region on the basis of the control of the selecting portion 9.

A correcting portion 11 corrects the defocus amount calculated by the focus detecting calculation portion 6, in conformity with the position of the focus detecting region selected by the selecting portion 9.

<About the Display portion 14>

Figure 2A:
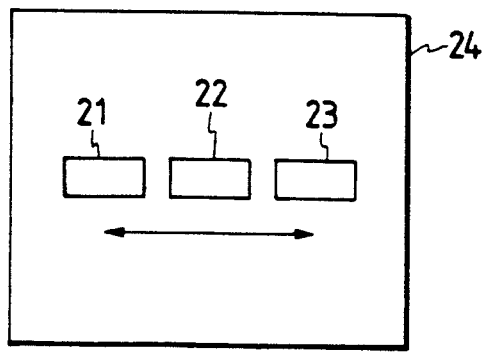
FIGS. 2A to 2E illustrate the forms of display of a focus detecting region.
Figure 2B:
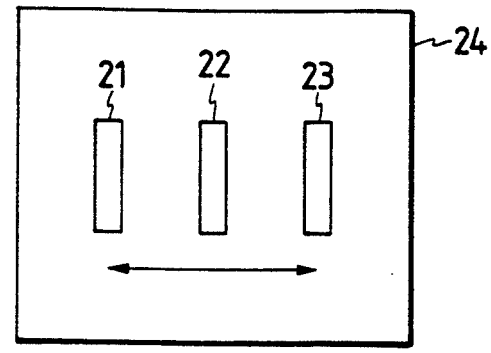

The display portion 14, as shown in FIGS. 2A and 2B, displays the focus detecting region selected from among the focus detecting regions 21, 22 and 23 on a finder image field 24 by the selecting portion 9.

Figure 2C:
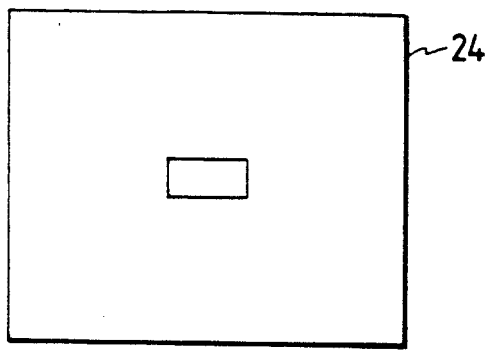
Figure 2D:
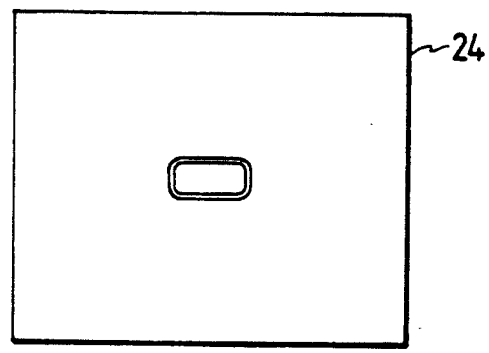
Figure 2E:
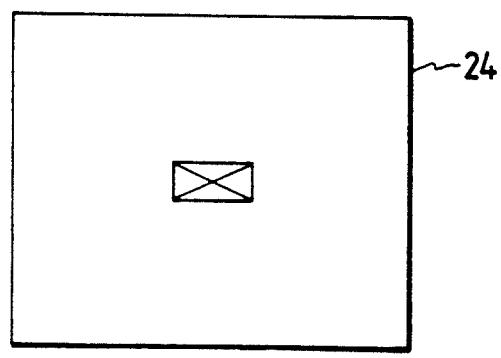

It also displays out-of-focus (FIG. 2C), in-focus (FIG. 2D) and impossibility of focus detection (FIG. 2E) in conformity with the focus adjusted state detected by the focus detecting calculation portion 6.

<About the Focus Detecting Optical System 3>

Figure 3:
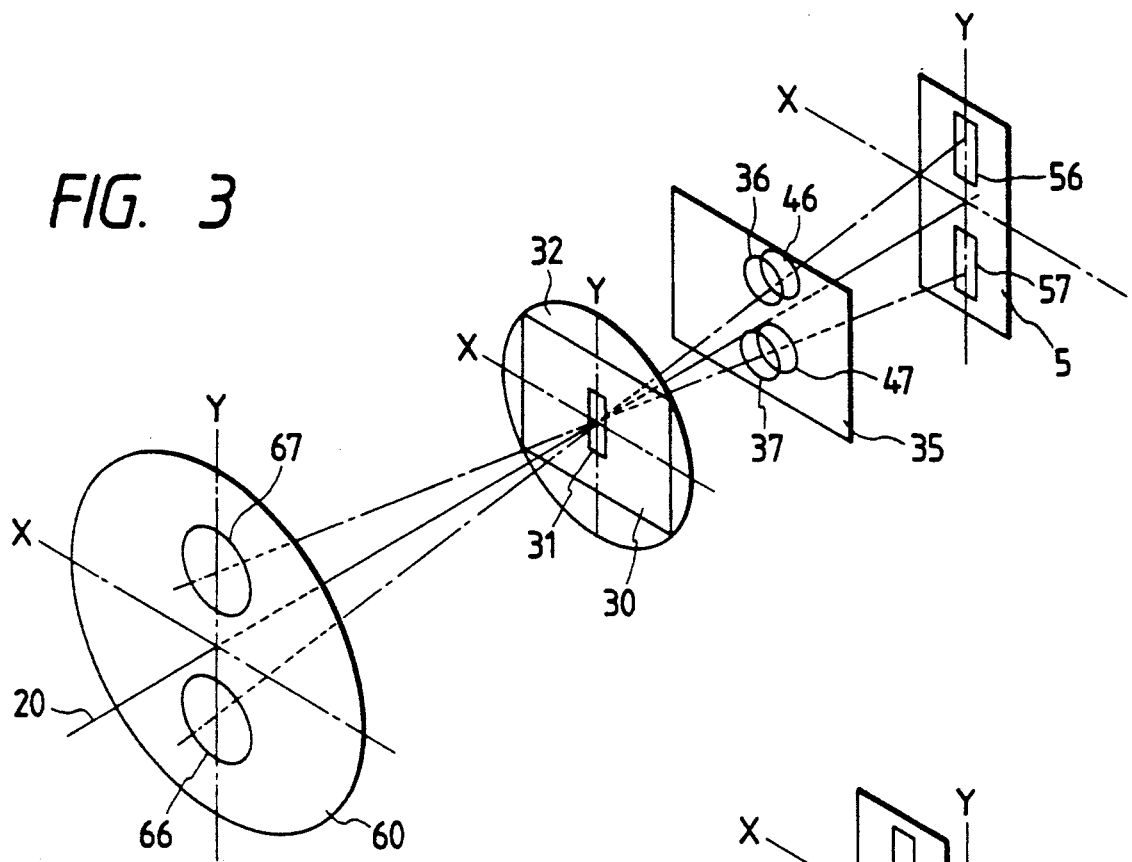
FIG. 3 shows a focus detecting optical system.

FIG. 3 shows an example of the construction of the focus detecting optical system 3.

The focus detecting optical system 3 comprises a field mask 30 having an opening 31, a condenser lens 32, a stop mask 35 having a pair of stop openings 36 and 37, and a pair of re-imaging lenses 46 and 47, and re-images a primary image formed by the phototaking optical system 19 as a pair of secondary images on the sensor 5 such as a CCD comprising a pair of light receiving portions 56 and 57. The light receiving portions 56 and 57 each are comprised of a plurality of picture elements.

Also, the field mask 30 and the condenser lens 32 are disposed near the predetermined focal plane 18 of the phototaking optical system 19.

A point bisecting the center of the opening 31, the center (the optical axis) of the condenser lens 32 and the center of the pair of stop openings 36 and 37, a point bisecting the center of the pair of re-imaging lenses 46 and 47, and a point bisecting the center of the pair of light receiving portions 56 and 57 are disposed on the optical axis of the phototaking optical system 19.

In FIG. 3, the X-axis is the longer side (horizontal) direction of the photographing image field and the Y-axis is the shorter side (vertical) direction of the photographing image field. The opening 31 sets a vertical focus detecting area on the photographing image field.

In the construction as described above, the pair of stop openings 36 and 37 are projected by the condenser lens 32 onto a pair of regions 66 and 67 on a surface 60 near the exit pupil of the phototaking optical system 19 which are symmetrical with respect to the optical axis 20, and light beams passing through these regions first form primary images near the field mask 30. The primary image formed in the opening 31 in the field mask 30 further passes through the condenser lens 32 and the pair of stop openings 36 and 37 and is formed as a pair of secondary images on the pair of light receiving portions 56 and 57 of the sensor 5 by the pair of re-imaging lenses 46 and 47.

The light intensity distributions of the pair of secondary images are photoelectrically converted by the light receiving portions 56 and 57 and become electrical object image signals.

Figure 4:
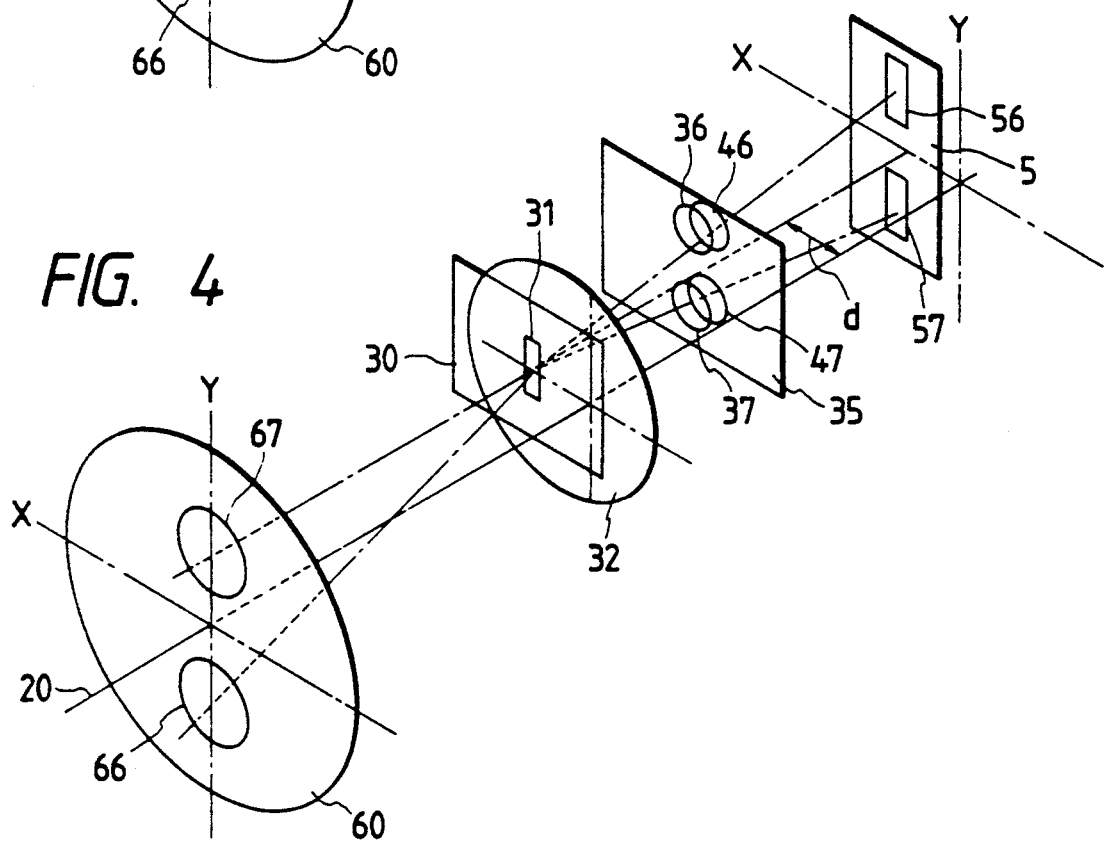
FIG. 4 shows a focus detecting optical system.
Figure 5:
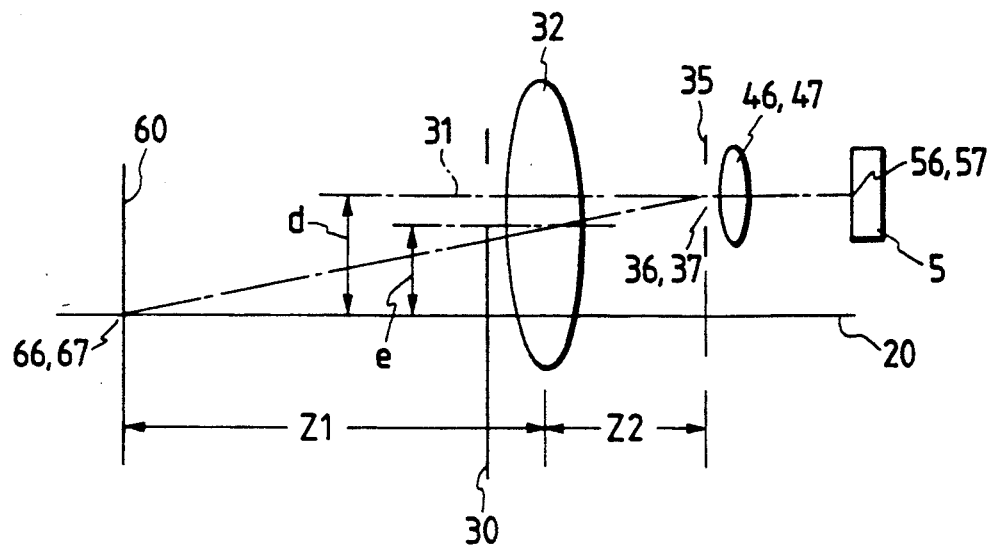
FIG. 5 is an illustration of a focus detecting optical system.

FIG. 4 shows an example in which the focus detecting optical system shown in FIG. 3 has been displaced by d in X direction and the focus detecting region has been changed on the image field, and FIG. 5 is a view of the focus detecting optical system of FIG. 4 as it is seen from the direction of the Y-axis.

The field mask 30 having the opening 31, the stop mask 35 having the pair of stop openings 36 and 37, and the sensor 5 having the pair of re-imaging lenses 46 and 47 and the light receiving portions 56 and 57 are parallel-moved by a from the optical axis in the direction of the X-axis, and the condenser lens 32 is parallel-moved by e from the optical axis 20 in the direction of the X-axis.

The distance e is found from the distance z1 from the condenser lens 32 to the surface 60, the distance z2 from the condenser lens 32 to the stop mask 35 and the distance d.

$$e = d \times z1/(z1 + z2) \qquad (1)$$

By adopting such disposition, the pair of stop openings 36 and 37 can be projected by the condenser lens 32 onto a pair of regions 66 and 67 in the surface 60 near the exit pupil of the phototaking optical system 19 which are symmetrical with respect to the optical axis 20, as in a case where there is not the deviation d, that is, the case of FIG. 3 where the focus detecting region is provided on the optical axis.

Light beams passing through these regions first form primary images near the field mask 30. The primary image formed in the opening 31 in the field mask 30 further passes through the condenser lens 32 and the pair of stop openings 36 and 37, and is formed as a pair of secondary images on the pair of light receiving portions 56 and 57 of the sensor 5 by the pair of reimaging lenses 46 and 47.

Accordingly, by adopting the disposition shown in FIG. 4, the focus detecting region can be changed.

Figure 6:
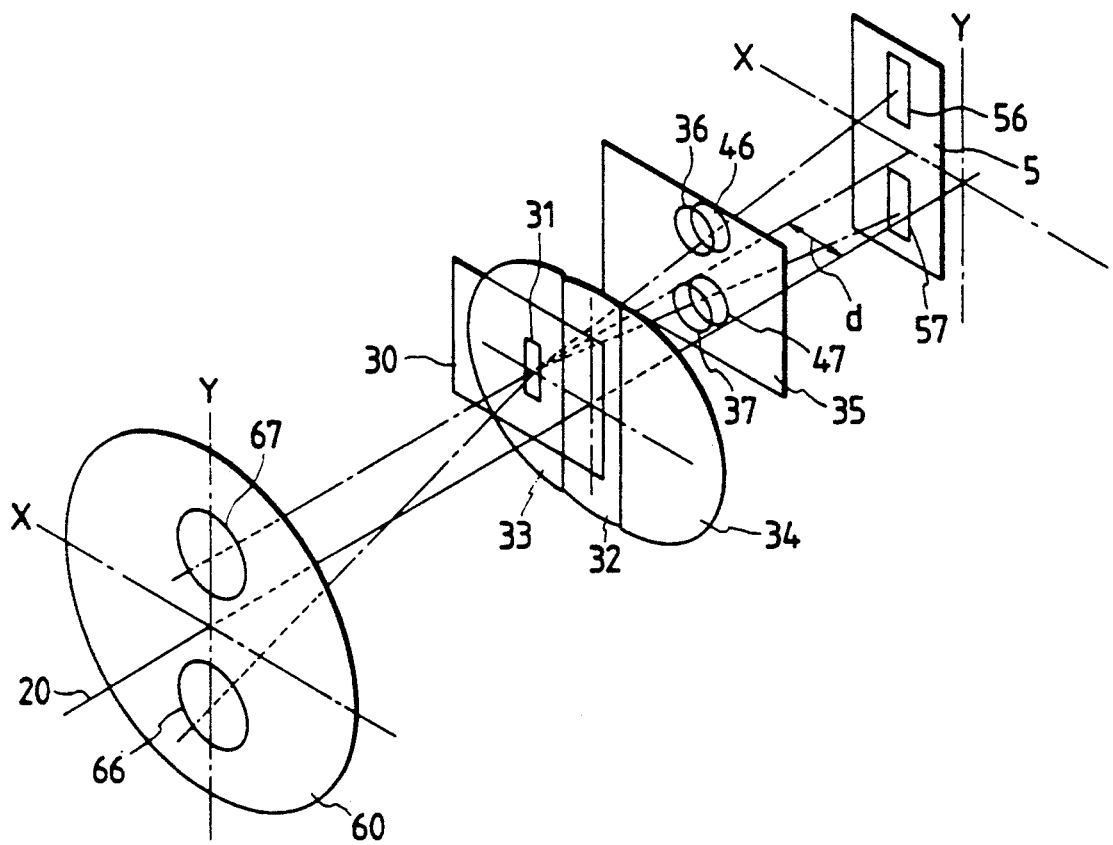
FIG. 6 shows a focus detecting optical system.

In the focus detecting optical system shown in FIG. 5, the condenser lens 32 is moved by e to thereby change the focus detecting region, while in a focus detecting optical system shown in FIG. 6, condenser lenses 33 and 34 are disposed at locations displaced by ±e from the optical axis 20, and three condenser lenses including a non-displaced condenser lens 32 are formed and disposed as a unit.

If this is done, it is not necessary that the condenser lenses be moved with the change of the focus detecting region.

Figure 7:
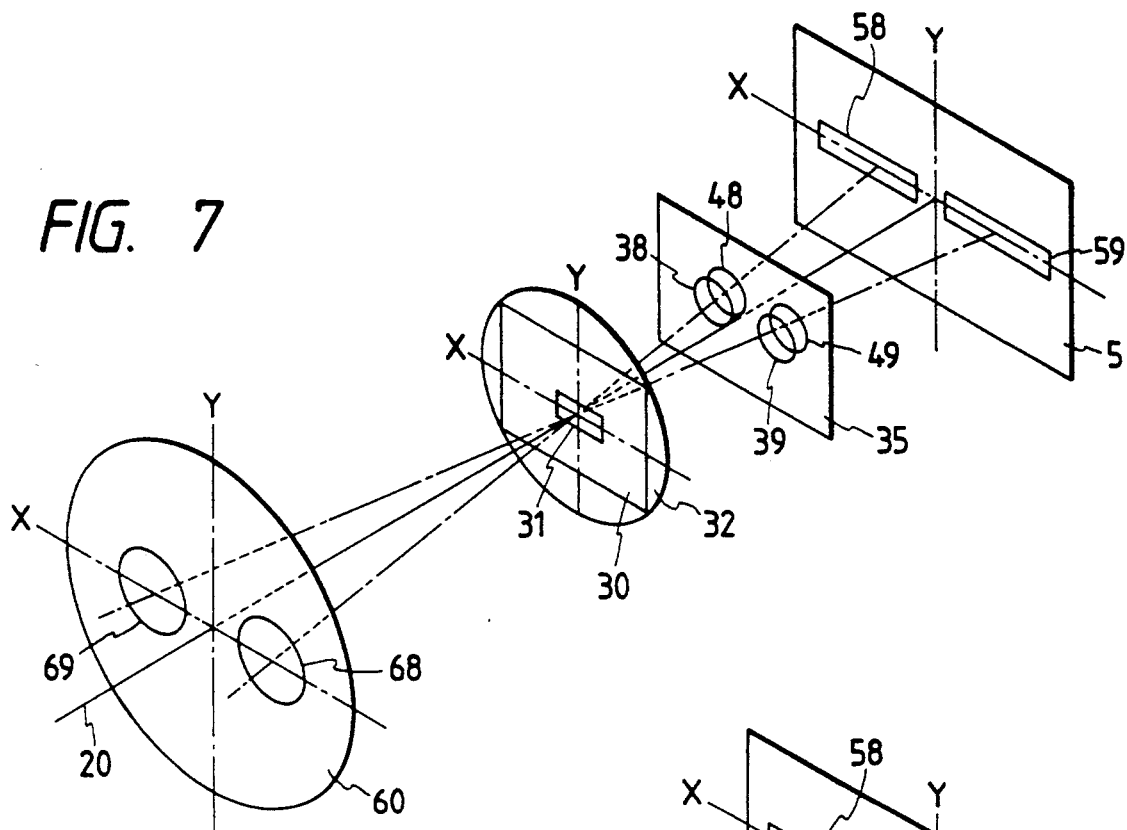
FIG. 7 shows a focus detecting optical system.

FIG. 7 shows an example of the focus detecting optical system in which the focus detecting region is disposed in the direction of the longer side of the image field, and this focus detecting optical system is basically one in which the focus detecting optical system shown in FIG. 3 has been rotated by 90°.

This focus detecting optical system comprises a field mask 30 having an opening 31 disposed in the direction of the longer side of the image field, a condenser lens 32, a stop mask 35 having a pair of stop openings 38 and 39, and a pair of re-imaging lenses 48 and 49, and a primary image formed by a phototaking optical system 19 is re-imaged as a pair of secondary images on a sensor 5 comprising a pair of light receiving portions 58 and 59.

Also, the pair of stop openings 38 and 39 are projected by the condenser lens 32 onto a pair of regions 68 and 69 on a surface 60 near the exit pupil of the phototaking optical system 19 which are symmetrical with respect to the optical axis 20.

Figure 8:
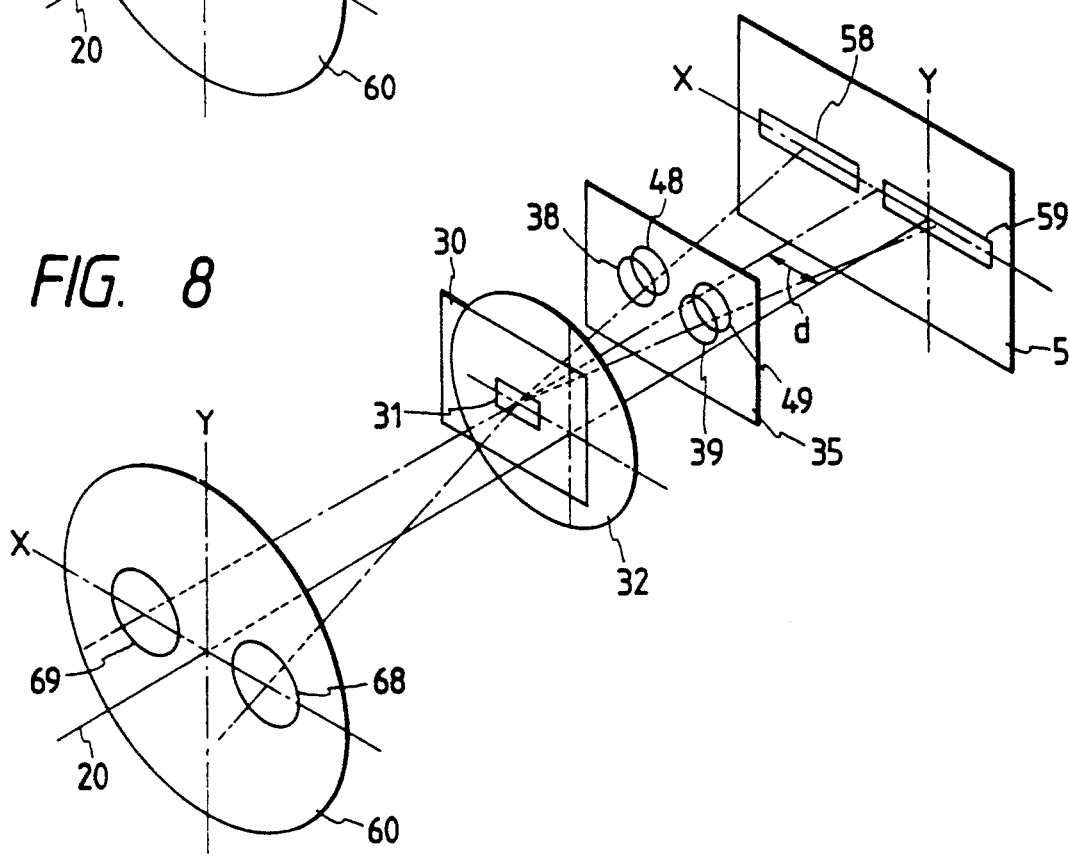
FIG. 8 shows a focus detecting optical system.
Figure 9:
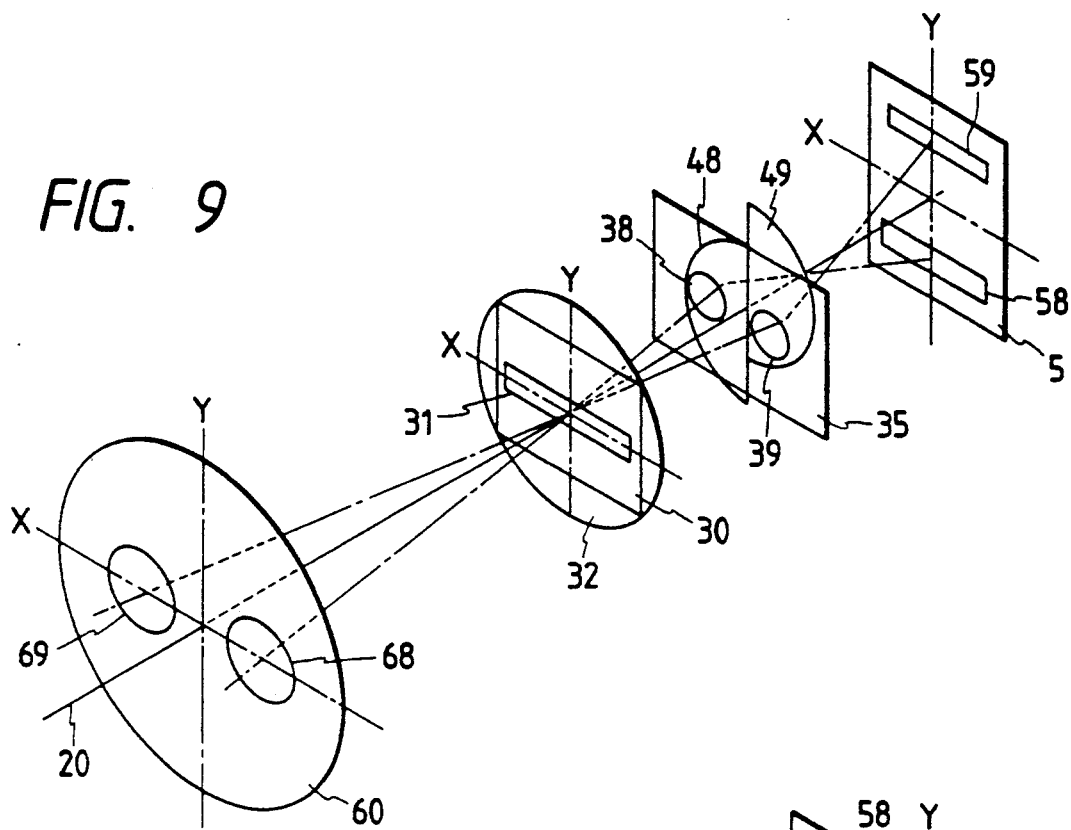
FIG. 9 shows a focus detecting optical system.

FIG. 8 shows an example in which the focus detecting optical system shown in FIG. 7 has been displaced by d in the direction of the X-axis and the focus detecting region has been changed on the image field, and FIG. 9 shows an example in which the arrangement of the re-imaging lenses and the light receiving portions of the sensor in the focus detecting optical system shown in FIG. 7 has been changed.

The pair of re-imaging lenses 48 and 49 are provided by dividing a lens into two halves, and are disposed with their relative position deviated along the plane of division.

Secondary images are formed on the light receiving portions 58 and 59 disposed parallel to each other on the sensor 5. In FIG. 7, the light receiving portions 58 and 59 are disposed on a straight line and therefore, if the length of the focus detecting region in the direction of the longer side is made indiscreetly great, secondary images may interfere with each other, whereas by the light receiving portions being disposed like this, there is eliminated the possibility of secondary images interfering with each other and the focus detecting region can be made long.

Figure 10:
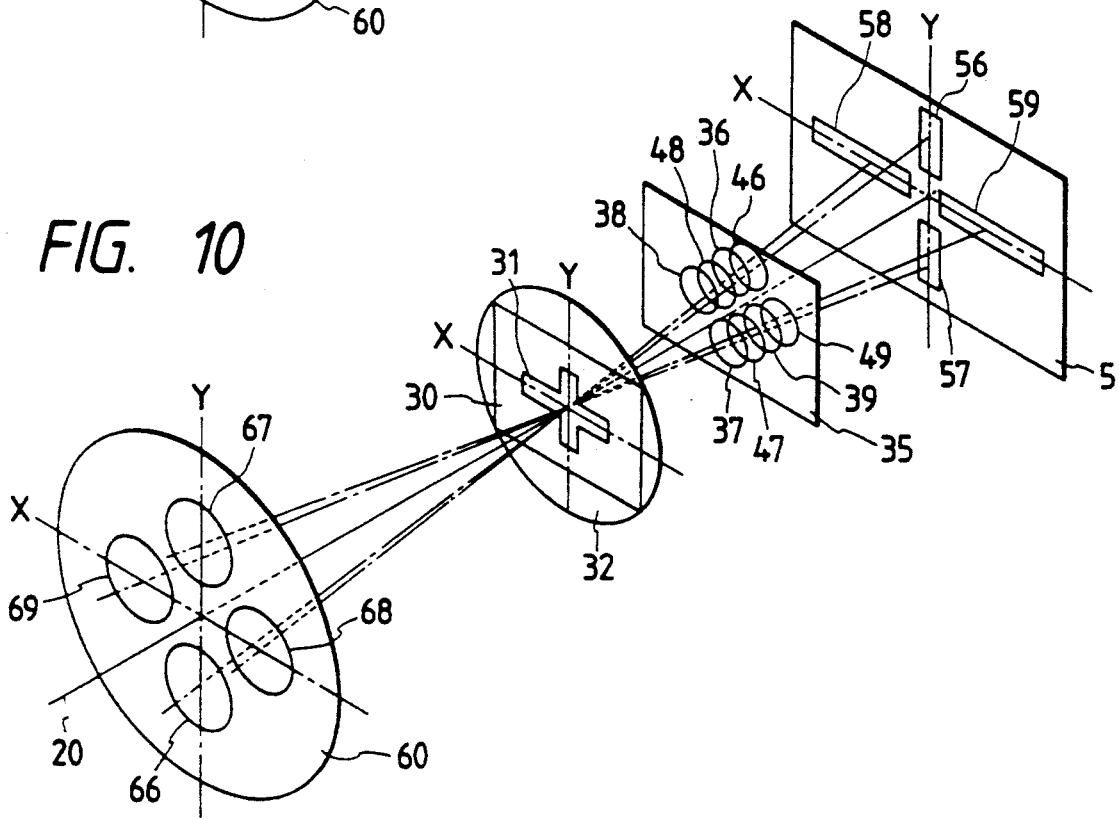
FIG. 10 shows a focus detecting optical system.

FIG. 10 shows an example of the focus detecting optical system in which the focus detecting region is disposed cruciformly in the directions of the longer and shorter sides of the image field, and this focus detecting optical system is basically one in which the focus detecting optical systems shown in FIGS. 3 and 7 are combined together.

This focus detecting optical system comprises a field mask 30 having a cruciform opening 31, a condenser lens 32, a stop mask 35 having two pairs of stop openings 36, 37, 38 and 39, and two pairs of re-imaging lenses 46, 47, 48 and 49, and a primary image formed by a phototaking optical system 19 is re-imaged as two pairs of secondary images on a sensor 5 comprising two pairs of light receiving portions 56, 57, 58 and 59.

Also, the two pairs of stop openings 36, 37, 38 and 39 are projected by the condensor lens 32 onto two pairs of regions 66, 67, 68 and 69 on a surface 60 near the exit pupil of the phototaking optical system 19 which are symmetrical with respect to the optical axis 20.

Again in the focus detecting optical systems shown in FIGS. 9 and 10, the field mask 30 having the opening 31, the stop mask 35, the re-imaging lenses 46–49 and the sensor 5 are parallel-moved by d from the optical axis 20 in the directions of the X-axis and the Y-axis and the condenser lens 32 is parallel-moved by e from the optical axis 20 in the directions of the X-axis and the Y-axis, whereby the focus detecting region can be changed by d.

<Description of the Focus Detecting Region Changing Portion>

Figure 11:
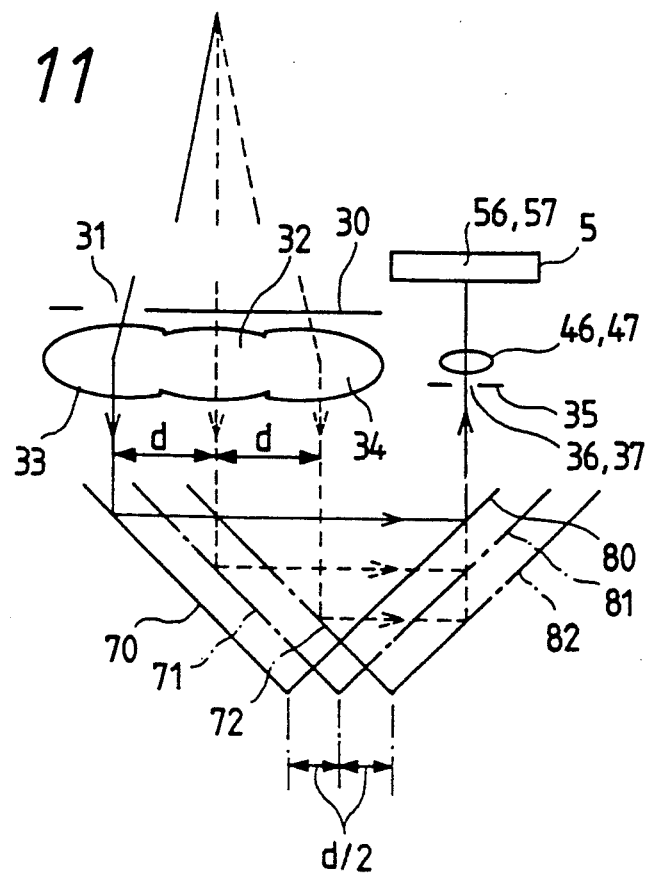
FIG. 11 illustrates a method of changing the focus detecting region.

In the focus detecting optical systems shown in FIGS. 4, 6 and 8, it is necessary that in order to displace the focus detecting region by d from the optical axis 20, the field mask 30 having the opening 31 be parallel-moved by d from the optical axis 20 in the directions of the X-axis and the Y-axis and in conformity therewith, the stop mask 35, the re-imaging lenses 46–49 and the sensor 5 be parallel-moved by d from the optical axis 20 in the directions of the X-axis and the Y-axis, but in FIG. 11, there is shown a focus detecting optical system in which mirrors 70–72 and 80–82 are moved with the movement of the field mask 30 to thereby eliminate the necessity of moving the stop mask 35, the re-imaging lenses 46–49 and the sensor 5. The focus detecting optical system shown in FIG. 11 corresponds to the optical system shown in FIG. 4 wherein the focus detecting region is displaced by d from the optical axis 20.

The primary image formed near the opening 31 in the field mask 30 passes through the opening 31 and the condenser lens 33, is reflected by a mirror 70 disposed at 45° with respect to the optical axis, is further reflected by a mirror 80 disposed at 90° with respect to the mirror 70, passes through the pair of fixed stop openings 36 and 37 and is formed as a pair of secondary images on the pair of light receiving portions 56 and 57 of the fixed sensor 5 by the pair of fixed re-imaging lenses 46 and 47.

That is, if the deflection by the mirrors 70 and 80 is developed, it will become similar to that in the optical system shown in FIG. 4.

Next, where the focus detecting region is disposed on the optical axis as shown in FIG. 3, the opening 31 in the field mask 30 is moved on the optical axis and also, the mirrors 70 and 80 are moved by d/2 relative to the amount of movement d of the field mask 30 in a direction perpendicular to the optical axis 20. The mirrors at this position are designated by 71 and 81.

The primary image formed near the opening 31 in the field mask 30 passes through the opening 31 and the condenser lens 32, is reflected by a mirror 71 disposed at 45° with respect to the optical axis, is further reflected by a mirror 81 disposed at 90° with respect to the mirror 71, passes through the pair of fixed stop openings 36 and 37 and is formed as a pair of secondary images on the pair of light receiving portions 56 and 57 of the fixed sensor 5 by the pair of fixed re-imaging lenses 46 and 47.

That is, if the deflection by the mirrors 71 and 81 is developed, it will become similar to that in the optical system shown in FIG. 3.

The length of the optical path from the primary image plane to the sensor 5 is the same as that when the formed primary image is deflected by the mirrors 70 and 80.

Where the focus detecting region is set at a location displaced by d in the opposite direction from the optical axis 20, the opening 31 in the field mask 30 is moved by d in the opposite direction from the optical axis 20 and also, the mirrors 71 and 81 are moved by d/2 relative to the amount of movement d of the field mask 30, in a direction perpendicular to the optical axis 20. The mirrors at this position are designated by 72 and 82.

The primary image formed near the opening 31 in the field mask 30 passes through the opening 31 and the condenser lens 33, is reflected by the mirror 72 disposed at 45° with respect to the optical axis, is further reflected by the mirror 82 disposed at 90° with respect to the mirror 72, passes through the pair of fixed stop openings 36 and 37 and is formed as a pair of secondary images on the pair of light receiving portions 56 and 57 of the fixed sensor 5 by the pair of fixed re-imaging lenses 46 and 47.

That is, if the deflection by the mirrors 72 and 82 is developed, it will become similar to that in the optical system shown in FIG. 4.

The length of the optical path from the primary image plane to the sensor 5 is the same as that when the primary image is deflected by the mirrors 70 and 80 or the mirrors 71 and 81.

As described above, two mirrors 70–72 and 80–82 the angle between which is 90° and the angle of which with respect to the optical axis is 45° are inserted between the condenser lenses 32–34 and the stop mask 35 and these mirrors 70–72 and 80–82 are moved by ½ of the amount of movement of the field mask 30 in the same direction as the direction of movement of the stop mask 35, whereby the focus detecting region can be changed with the pair of stop openings 36 and 37, the pair of re-imaging lenses 46 and 47 and the sensor 5 kept fixed.

Here, if there is the angular accuracy of 90° of the two mirrors, even if the angle thereof with respect to the optical axis 20 is more or less erroneous, the angle of emergence relative to the angle of incidence will not vary and the length of the optical path will neither vary and therefore, the optical problem resulting from movement will be little.

Also, during the movement of the mirrors, some error in the amount of movement thereof will pose no problem if the accuracy of the parallel movement is maintained.

Figure 12:
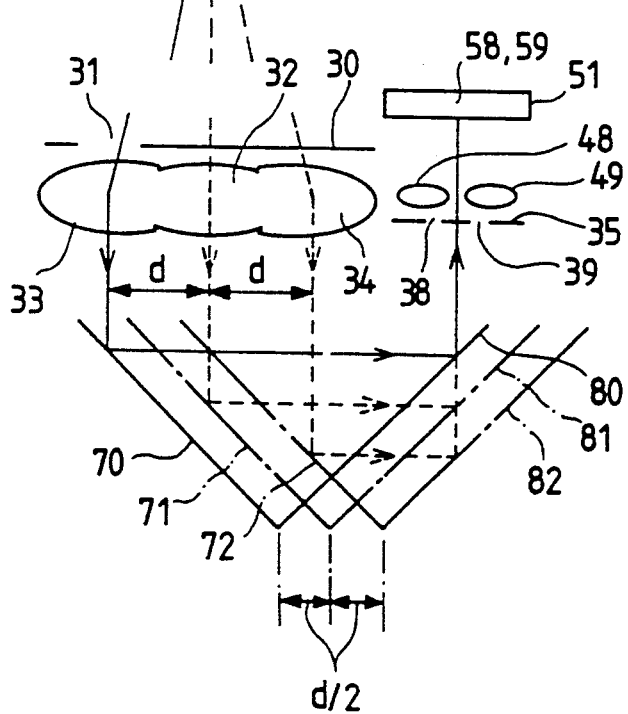
FIG. 12 illustrates a method of changing the focus detecting region.

In the focus detecting optical system shown in FIG. 11, the focus detecting region is disposed in a direction perpendicular to the direction of movement of the focus detecting region, while FIG. 12 shows a focus detecting optical system in which the focus detecting region is disposed in the same direction as the direction of movement of the focus detecting region. This corresponds to FIGS. 7 and 8.

This optical system is similar to the optical system shown in FIG. 11 in the construction of the field mask 30 to the mirrors 70–72 and 80–82, and the difference between the two optical systems is that the direction of arrangement of the pair of fixed stop openings 38 and 39, the direction of arrangement of the pair of fixed re-imaging lenses 48 and 49 and the direction of arrangement of the pair of light receiving portions 58 and 59 of the fixed sensor 5 are rotated by 90° relative to those in the optical system shown in FIG. 11.

Again in such a construction, as in the optical system shown in FIG. 11, two mirrors 70, 80, 71, 81, 72, 82 the angle between which is 90° and the angle of which with respect to the optical axis 20 is 45° are inserted between the condenser lenses 32–34 and the stop mask 35 and these mirrors are moved by ½ of the amount of movement of the field mask 30 in the same direction as the direction of movement of the stop mask 35, whereby the focus detecting region can be changed with the pair of stop openings 38 and 39, the pair of re-imaging lenses 48 and 49 and the sensor 5 kept fixed.

Figure 13:
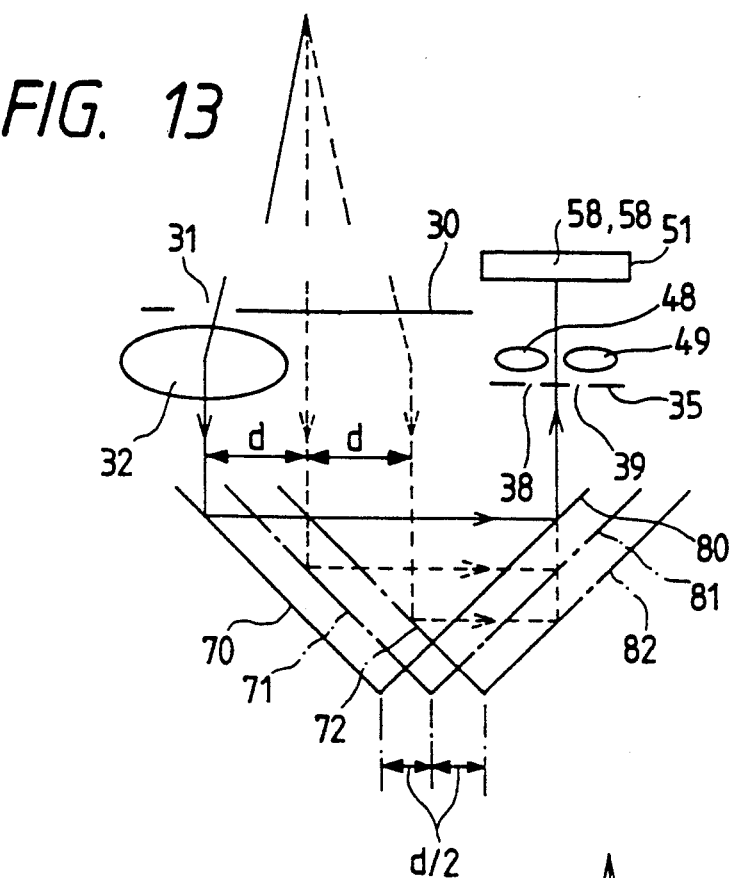
FIG. 13 illustrates a method of changing the focus detecting region.

In the focus detecting optical system shown in FIG. 12, the condenser lenses 32–34 are disposed correspondingly to the focus detecting region, while FIG. 13 shows a focus detecting optical system in which the condenser lens 32 is designed to be moved in conformity with a change of the focus detecting region.

The amount of displacement of the condenser lens 32 is determined as shown by equation (1) relative to the amount of movement d of the field mask 30.

Figure 14:
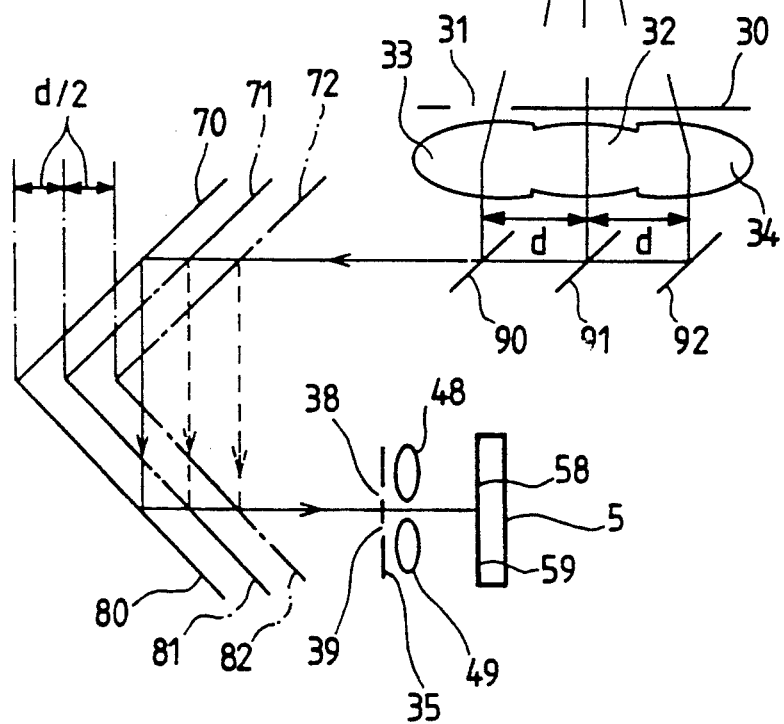
FIG. 14 illustrates a method of changing the focus detecting region.

In FIG. 13, two mirrors 70, 80, 71, 81, 72, 82 the angle between which is 90° are inserted between the condenser lens 32 and the stop mask 35 and these mirrors are moved as a unit in a direction perpendicular to the optical axis 20 to thereby change the focus detecting region, while FIG. 14 shows a focus detecting optical system in which the mirrors are moved in a direction perpendicular to the optical axis 20 to thereby change the focus detecting region.

When the focus detecting region is displaced (to the left as viewed in FIG. 14) by d from the optical axis 20 and is set there, the primary image formed near the opening 31 in the field mask 30 passes through the opening 31 and the condenser lens 33, is reflected by a mirror 90 disposed at 45° with respect to the optical axis, is deflected by 90° by the mirror 70, is further reflected by the mirror 80 disposed at 90° with respect to the mirror 70, passes through the pair of fixed stop openings 38 and 39 and is formed as a pair of secondary images on the pair of light receiving portions 58 and 59 of the fixed d sensor 5 by the pair of fixed re-imaging lenses 48 and 49.

That is, if the deflection by the mirrors 90, 70 and 80 is developed, it will become similar to that in the optical system shown in FIG. 8.

Next, when the focus detecting region is dispsoed on the optical axis as shown in FIG. 7, the opening 31 in the field mask 30 is moved by d onto the optical axis and also, the mirror 90 is moved by d onto the optical axis and provides a mirror 91. Further, the mirrors 70 and 80 are moved by d/2 relative to the amount of movement d of the field mask 30, in the direction of the optical axis. The mirrors at this position are designated by 71 and 81.

The primary image formed near the opening 31 in the field mask 30 passes through the opening 31 and the condenser lens 32, reflected by a mirror 91 disposed at 45° with respect to the optical axis 20, is deflected by 90° by the mirror 71, is further reflected by the mirror 81 disposed at 90° with respect to the mirror 71, passes through the pair of fixed stop openings 38 and 39, and is formed as a pair of secondary images on the pair of light receiving portions 58 and 59 of the fixed sensor 5 by the pair of fixed re-imaging lenses 48 and 49.

That is, if the deflection by the mirrors 91, 71 and 81 is developed, it will become similar to that in the focus detecting optical system shown in FIG. 7. Also, at this time, the length of the optical path from the primary image plane to the sensor 5 is the same as that when the primary image is deflected by the mirrors 70 and 80.

Next, when the focus detecting region is set at a position displaced by d in the opposite direction from the optical axis 20 (to the right as viewed in FIG. 14), the opening 31 in the field mask 30 is moved by d in the opposite direction from the optical axis 20 and also, the mirror 91 is further moved by d and provides a mirror 92. Further, the mirrors 71 and 81 are moved by d/2 relative to the optical axis 20 and the amount of movement d of the field mask. The mirrors at this position are designated by 72 and 82.

The primary image formed near the opening 31 in the field mask 30 passes through the opening 31 and the condenser lens 33, is reflected by the mirror 92 disposed at 45° with respect to the optical axis, is deflected by 90° by the mirror 72, is further reflected by the mirror 82 disposed at 90° with respect to the mirror 72, passes through the pair of fixed stop openings 38 and 39, and is formed as a pair of secondary images on the pair of light receiving portions 58 and 59 of the fixed sensor 5 by the pair of fixed re-imaging lenses 48 and 49.

Here, if the deflection by the mirrors 72 and 82 are developed, it will become similar to that in FIG. 4. Also, the length of the optical path from the primary image plane to the sensor 5 becomes the same as that when the primary image is deflected by the mirrors 70 and 80 or the mirrors 71 and 81.

As described above, the mirror for deflecting the optical axis by 90° is inserted between the condenser lens and the stop mask, this mirror is moved in the direction of movement of the field mask in response to the movement of the stop mask 30 and also, two mirrors the angle between which is 90° and the angle of which with respect to the deflected optical axis is 45° are inserted and these mirrors are moved by ½ of the amount of movement of the field mask in the direction of the deflected optical axis, whereby the focus detecting region can be changed with the pair of stop openings 38 and 39, the pair of re-imaging lenses 48 and 49 and the sensor 5 kept fixed.

If there is the angular accuracy of the two mirrors, even if the angle thereof with respect to the optical axis is more or less erroneous, the angle of emergence relative to the angle of incidence will not vary and the length of the optical path will neither vary and therefore, the optical problem resulting from movement will be little. During the movement of the mirrors, some error in the amount of movement thereof will pose no problem if the accuracy of the parallel movement is maintained.

Figure 15:
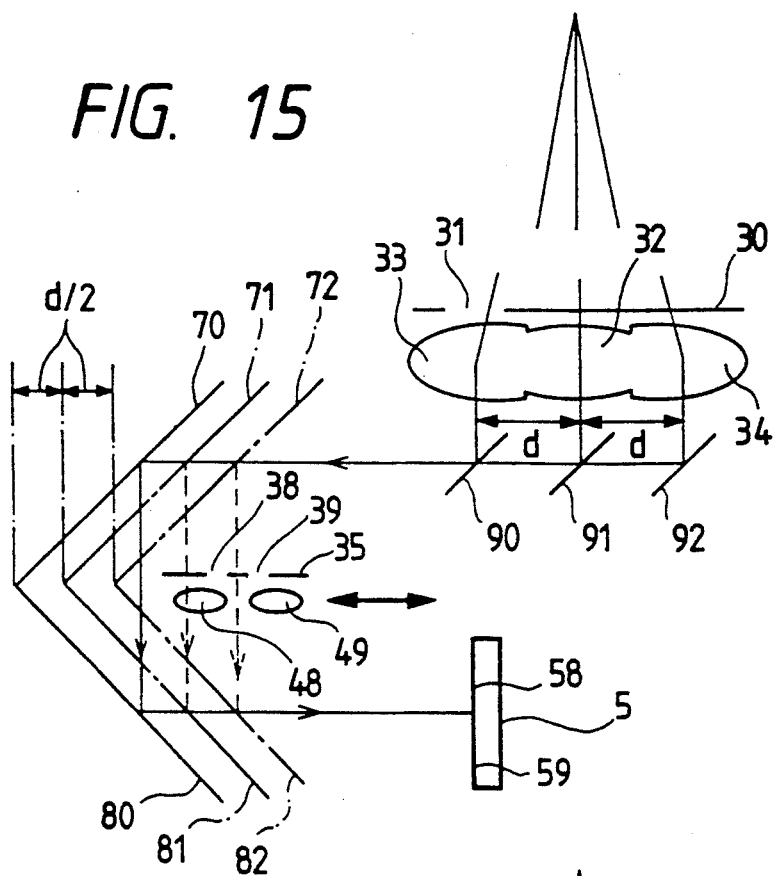
FIG. 15 illustrates a method of changing the focus detecting region.

In the focus detecting optical system shown in FIG. 14, the pair of stop openings 38 and 39 and the pair of re-imaging lenses 48 and 49 are fixed, while in FIG. 15, there is shown a focus detecting optical system in which a pair of stop openings 38 and 39 and a pair of re-imaging lenses 48 and 49 are inserted between two mirrors the angle between which is 90° and the angle of which with respect to the deflected optical axis is 45° and these are moved with the mirrors.

Again in such a construction, irrespective of a change of the focus detecting region, the lengths of the optical paths from the primary image plane to the pair of stop openings 38 and 39 and the pair of re-imaging lenses 48 and 49 and the lengths of the optical paths from the pair of stop openings 38 and 39 and the pair of re-imaging lenses 48 and 49 to the sensor 5 are invariable.

In the above-described embodiment, there has been shown an example in which the mirrors 90, 91 and 92 are moved, but alternatively, discrete mirrors may be changed over and inserted into the optical path.

Figure 17A:
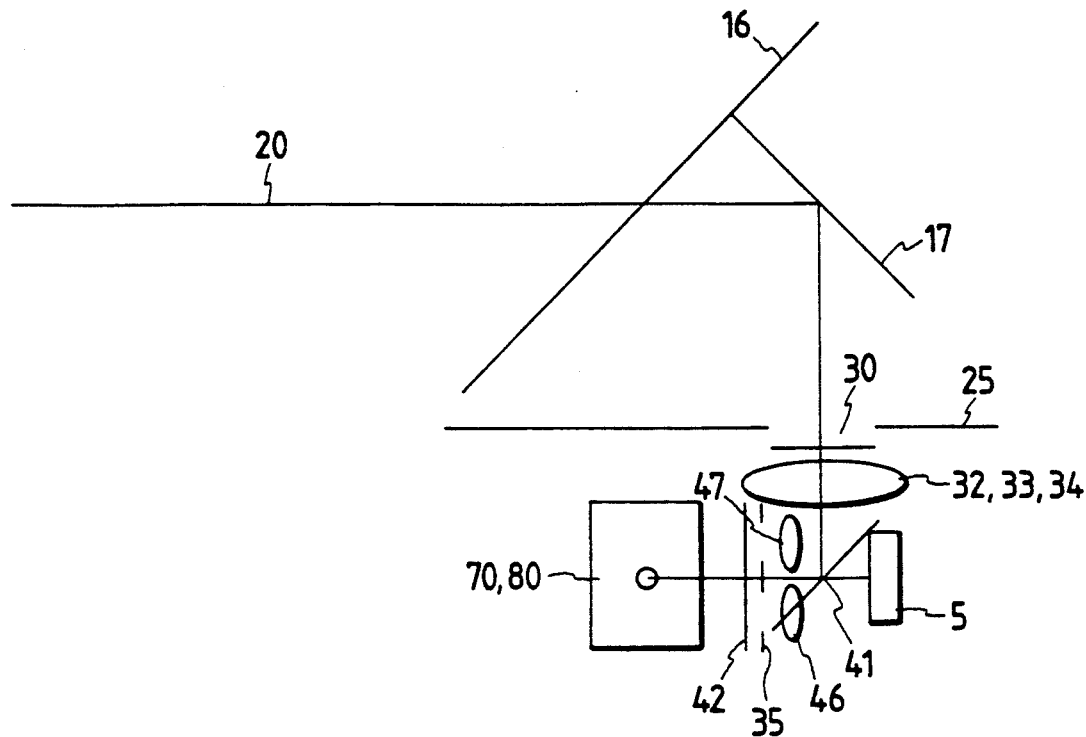
FIGS. 17A and 17B show an example of the disposition of a focus detecting region changing portion in a camera body.
Figure 17B:
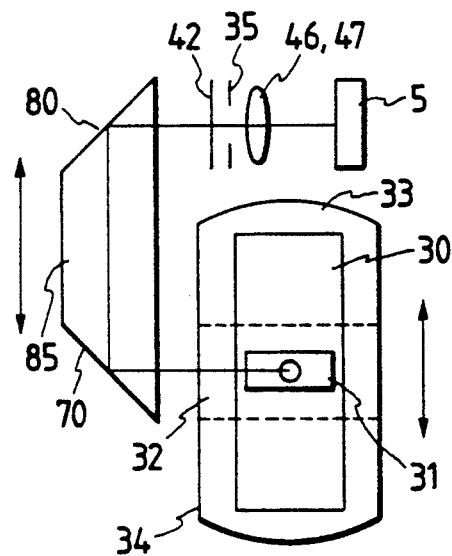

FIGS. 17A and 17B show the arrangement when the optical system shown in FIG. 11 is disposed in the camera body 1, FIG. 17A being a side view, and FIG. 17B being a view of the arrangement as it is seen from the direction of the sub-mirror 17.

The phototaking optical axis 20 passes through the main mirror 16, is deflected by 90° by the sub-mirror 17 and is directed to the bottom 25 of the camera body. The optical system shown in FIG. 11 is disposed at the bottom 25 of the camera body.

The field mask 30 and the optical block 85 are moved with a change of the focus detecting region.

There is a mirror 41 between the condenser lenses 32, 33, 34 and the mirror 70, and this mirror makes the optical axis parallel to the original phototaking optical axis 20. By doing so, the deflection by the mirrors 70 and 80 is effected in a plane parallel to the bottom surface of the camera body and therefore, the bottom of the camera body is not thick, and this is advantageous in mounting.

Also, an infrared cut filter is disposed in front of the stop mask. By the infrared cut filter being disposed at such a location, the infrared cut filter may be of the smallest size even where the focus detecting region is moved or there is a plurality of focus detecting regions, and this is advantageous in cost.

Also, the two mirrors 70 and 80 the angle between which is 90° are formed integrally with the optical block 85. If this is done, the angular accuracy will be improved and the error resulting from movement will be eliminated.

Figure 18A:
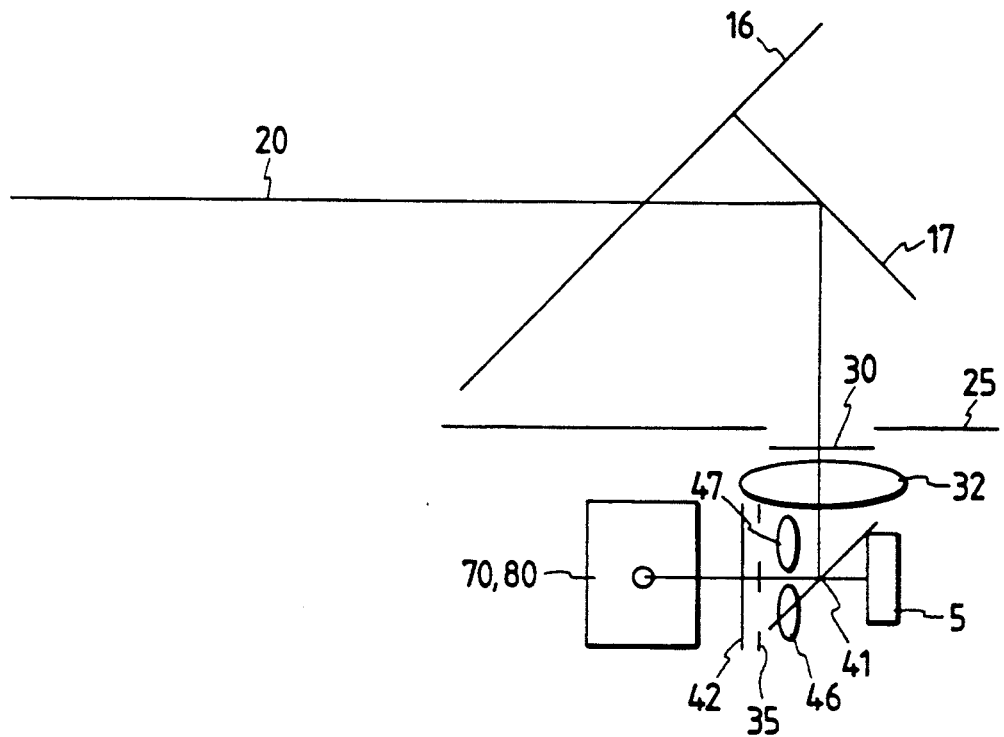
FIGS. 18A and 18B show an example of the disposition of a focus detecting region changing portion in a camera body.
Figure 18B:
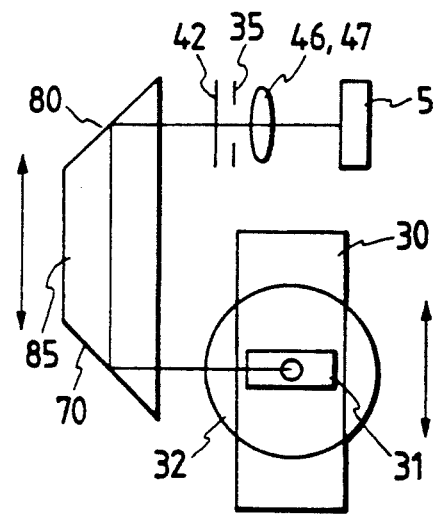

FIGS. 18A and 18B show the arrangement when the optical system shown in FIG. 13 is disposed in the camera body 1, FIG. 18A being a side view, and FIG. 18B being a view of the arrangement as it is seen from the direction of the sub-mirror 17.

The phototaking optical axis 20 passes through the main mirror 16, is deflected by 90° by the sub-mirror 17 and is directed to the bottom 25 of the camera body. The optical system shown in FIG. 13 is disposed at the bottom 25 of the camera body.

The field mask 30, the condenser lens 32 and the optical block 85 are moved with a change of the focus detecting region.

Figure 19A:
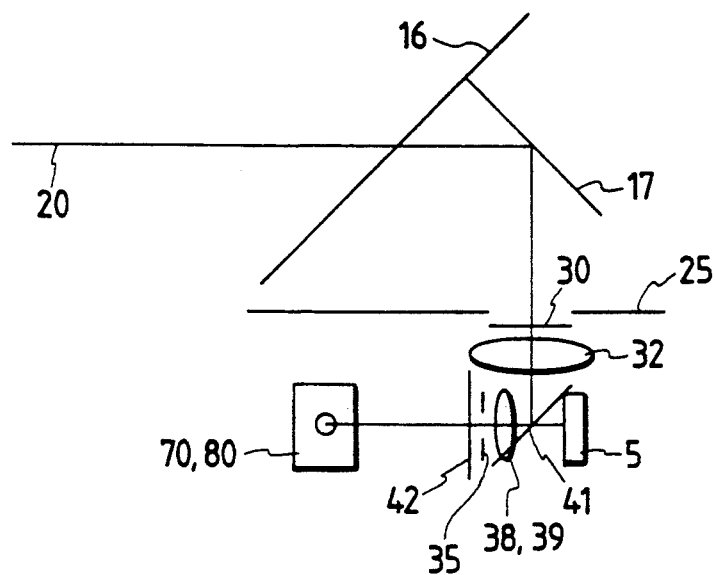
FIGS. 19A and 19B show an example of the disposition of a focus detecting region changing portion in a camera body.
Figure 19B:
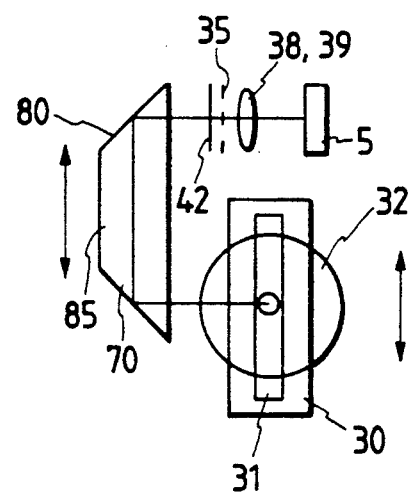

FIGS. 19A and 19B show the arrangement when the optical system shown in FIG. 9 is disposed in the camera body 1, FIG. 19A being a side view, and FIG. 19B being a view of the arrangement as it is seen from the direction of the sub-mirror.

The phototaking optical axis 20 passes through the main mirror 16, is deflected by 90° by the sub-mirror 17 and is directed to the bottom 25 of the camera body. The optical system shown in FIG. 9 is disposed at the bottom 25 of the camera body.

The condenser lens 32 and the optical block 85 are moved with a change of the focus detecting region.

Figure 20A:
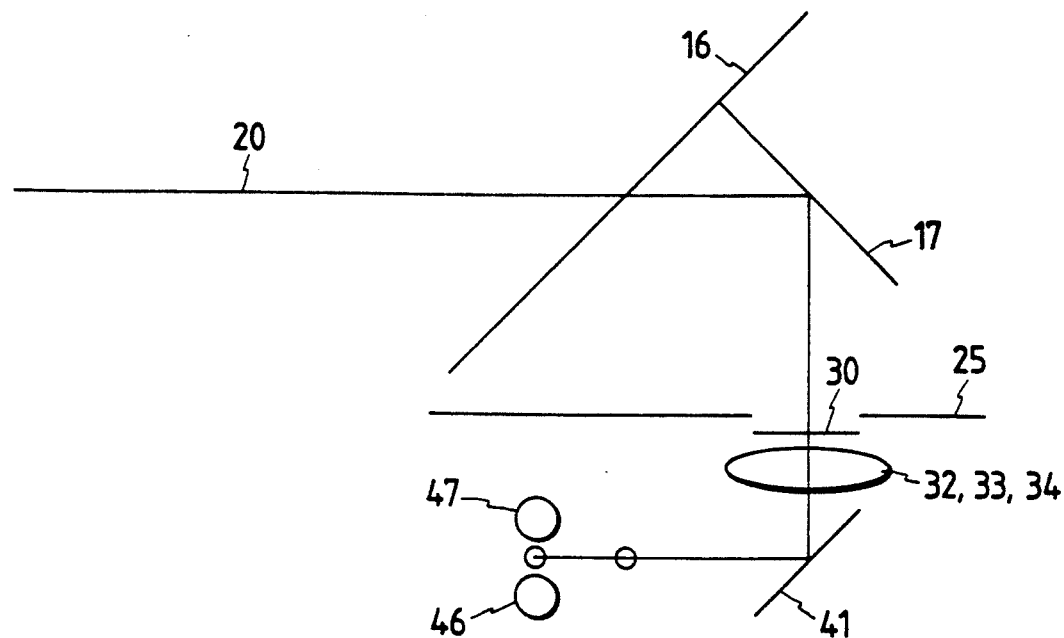
FIGS. 20A and 20B show an example of the disposition of a focus detecting region changing portion in a camera body.
Figure 20B:
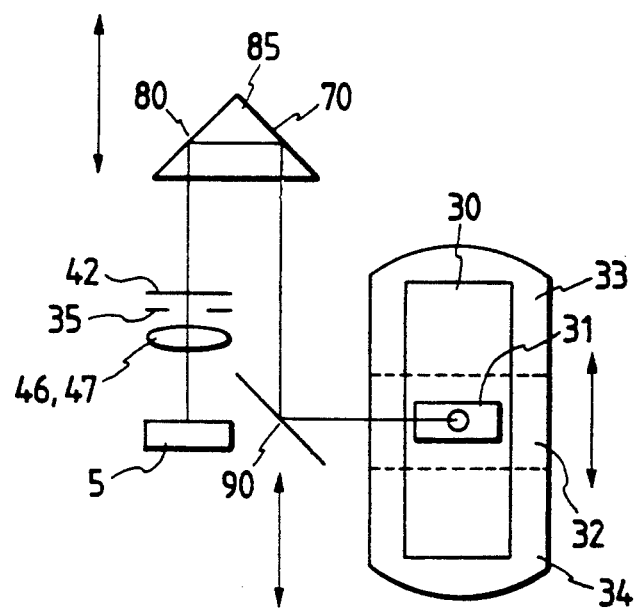

FIGS. 20A and 20B show the arrangement when the optical system shown in FIG. 14 (which differs in the direction of the focus detecting region) is disposed in the camera body 1, FIG. 20A being a side view, and FIG. 20B being a view of the arrangement as it is seen from the direction of the sub-mirror.

The phototaking optical axis 20 passes through the main mirror 16, is deflected by 90° by the sub-mirror 17 and is directed to the bottom 25 of the camera body. The optical system shown in FIG. 14 is disposed at the bottom 25 of the camera body.

The field mask 30, the mirror 90 and the optical block 85 are moved with a change of the focus detecting region.

Figure 21A:
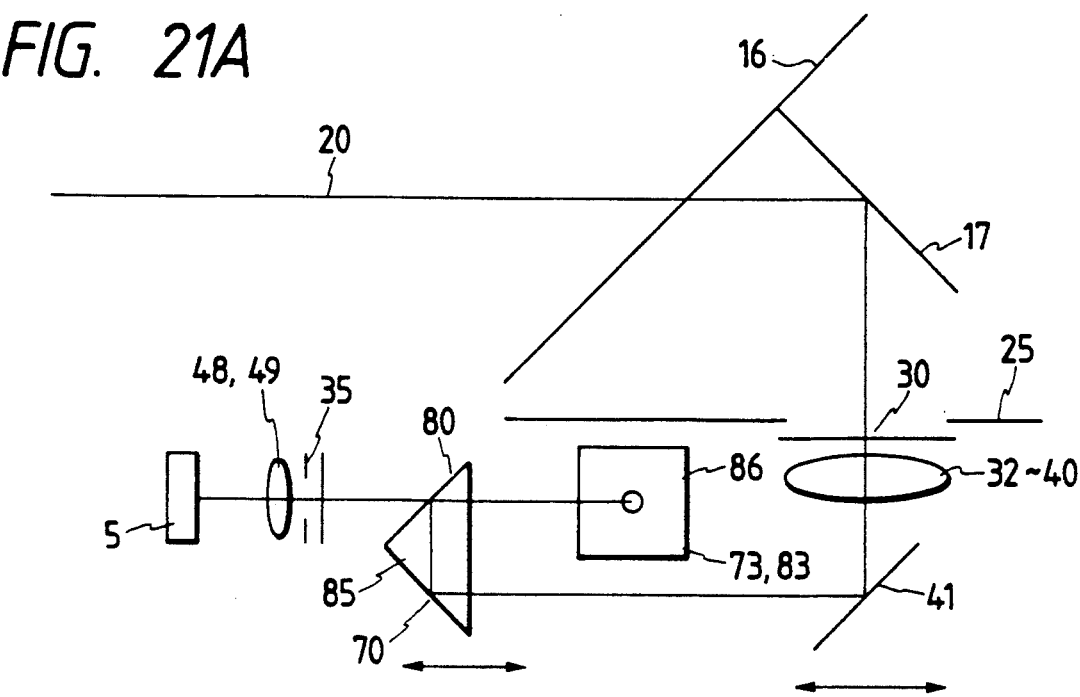
FIGS. 21A and 21B show an example of the disposition of a focus detecting region changing portion in a camera body.
Figure 21B:
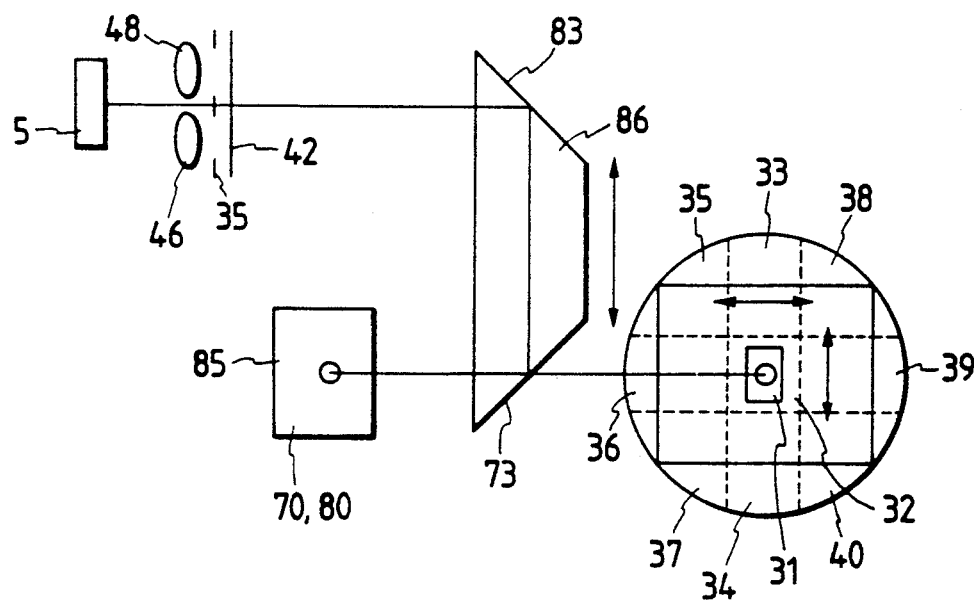

FIGS. 21A and 21B show the arrangement when the optical system shown in FIGS. 12 or 14 is disposed in the camera body 1 and further the change of the focus detecting region is made two-dimensionally possible, FIG. 21A being a side view, and FIG. 21B being a view of the arrangement as it is seen from the direction of the sub-mirror.

The phototaking optical axis 20 passes through the main mirror 16, is deflected by 90° by the sub-mirror 17 and is directed to the bottom 25 of the camera body. The optical system shown in FIGS. 12 or 14 is disposed at the bottom 25 of the camera body.

The condenser lens is divided into individual condenser lenses 32–40 corresponding to two-dimensionally disposed focus detecting regions.

Also, two mirrors 70 and 80 which are formed integrally with the optical block 85 and the angle between which is 90° and a mirror 41 are prepared correspondingly to the movement of the focus detecting regions in the direction of the Y-axis, and forwardly thereof, two mirrors 73 and 83 which are formed integrally with the optical block 86 and the angle between which is 90° are prepared correspondingly to the movement of the focus detecting regions in the direction of the X-axis.

In FIG. 21, the field mask 30, the mirror 41 and the optical block 85 are moved in the direction of the Y-axis with the movement of the focus detecting region in the direction of the Y-axis. Also, the field mask 30 and the optical block 86 are moved in the direction of the X-axis with the movement of the focus detecting region in the direction of the X-axis.

Figure 22:
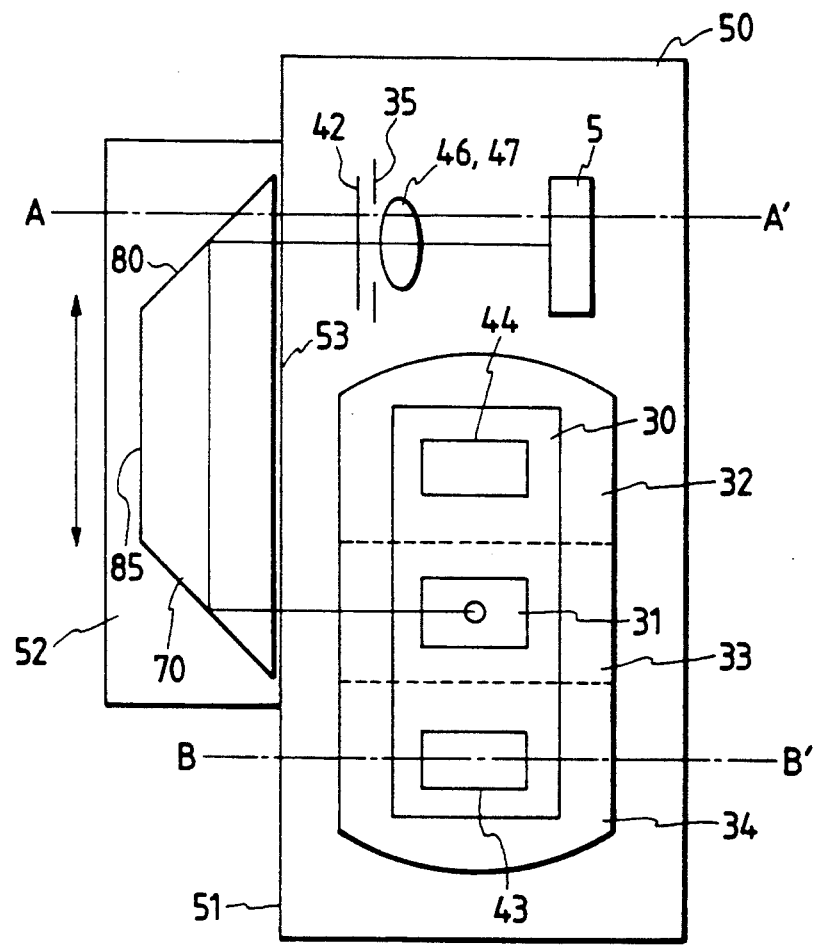
FIG. 22 shows an example of the disposition of a focus detecting region changing portion in a camera body.

FIG. 22 shows a method of supporting the optical members in the arrangement in the camera body 1 shown in FIG. 17.

The field mask 30, the condenser lenses 32, 33, 34, the mirror 41, the infrared cut filter 42, the stop mask 35, the re-imaging lenses 46, 47 and the sensor 5 are supported by a support member 50 integral therewith. In this example, the field mask 30 is not moved but fixed, and openings 31, 43 and 44 are provided correspondingly to the respective focus detecting regions.

Also, the optical block 85 is supported by another support member 52, and by the surface 53 of the support member 52 being along the surface 51 of the support member 50, the support member 52 is moved relative to the fixed support member 50.

Figure 23A:
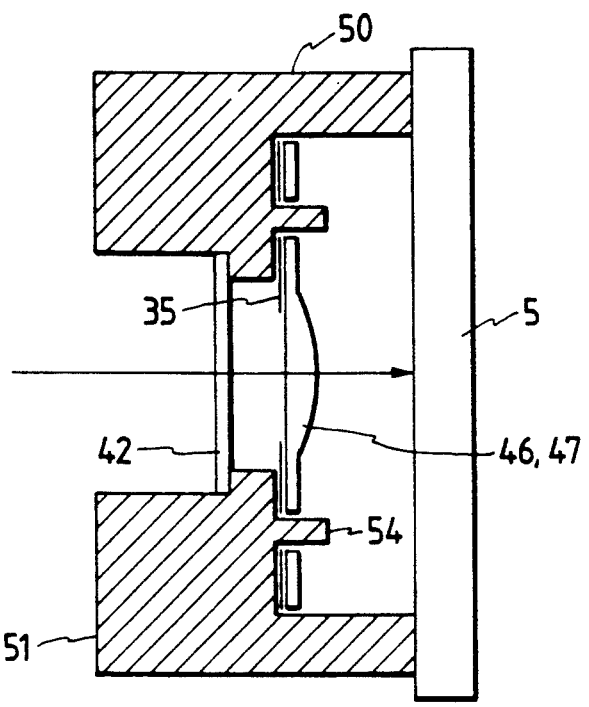
FIGS. 23A and 23B show an example of the disposition of a focus detecting region changing portion in a camera body.
Figure 23B:
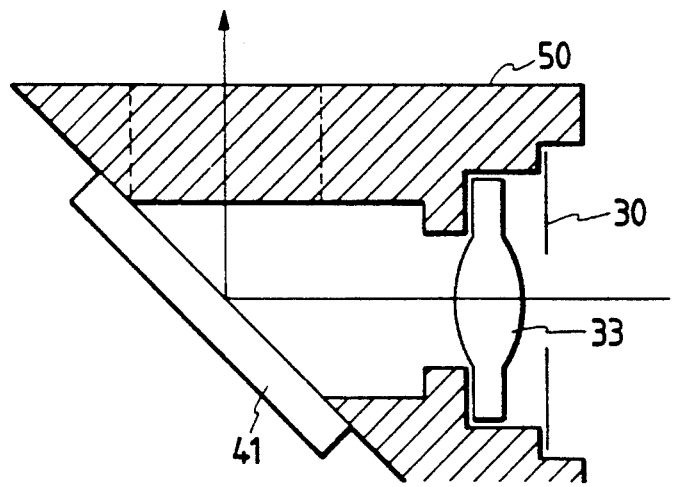

The cross-sections along the lines A—A' and B—B' of FIG. 22 are shown in FIGS. 23A and 23B, respectively.

The infrared cut filter 42, the stop mask 35, the re-imaging lenses 46 and 47 and the sensor 5 are adhesively secured to the support member 50 integral therewith, as shown. High relative positional accuracy is required particularly of the stop mask 35 and the re-imaging lenses 46 and 47 and therefore, these are commonly fitted to and supported by bosses 54 formed on the support member 50.

Also, the field mask 30, the condenser lenses 32, 33 and 34 and the mirror 41 are adhesively secured to the support member 50 integral therewith, as shown.

By the fixed members being supported by a single support member 50 in this manner, the error of the relative position of the optical members can be reduced.

Figure 24:
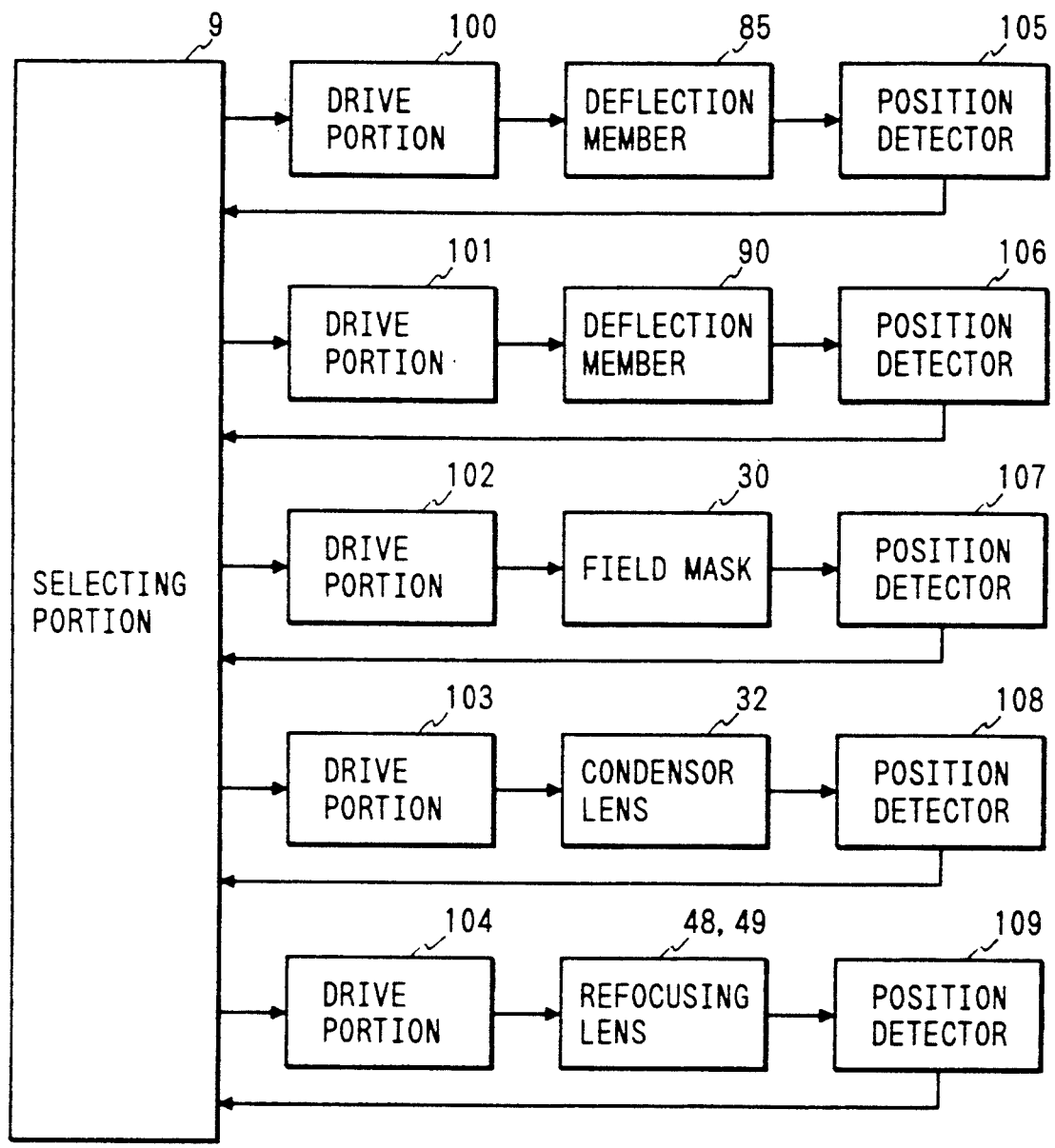
FIG. 24 is a block diagram showing the construction of another embodiment of the present invention.

FIG. 24 is a detailed block diagram when in the construction of the above-described focus detecting region changing portion, the selecting portion 9 changes the focus detecting region by the use of the drive portion 10.

The selecting portion 9 drives the following drive portions as required to thereby effect a change of the focus detecting region.

The selecting portion 9 drives a drive portion 100 to thereby drive the deflecting member, for example, the optical block 85 shown in FIG. 20, and feeds back the amount of drive by a position detector 105 and controls it to a desired amount of drive.

The selecting portion 9 drives a drive portion 101 to thereby drive a deflecting member, for example, the mirror 90 shown in FIG. 20, and feeds back the amount of drive by a position detector 106 and controls it to a desired amount of drive.

The selecting portion 9 drives a drive portion 102 to thereby drive the field mask 30, and feeds back the amount of drive by a position detector 107 and controls it to a desired amount of drive.

The selecting portion 9 drives a drive portion 103 to thereby drive the condenser lens 32, and feeds back the amount of drive by a position detector 108 and controls it to a desired amount of drive.

Figure 16:
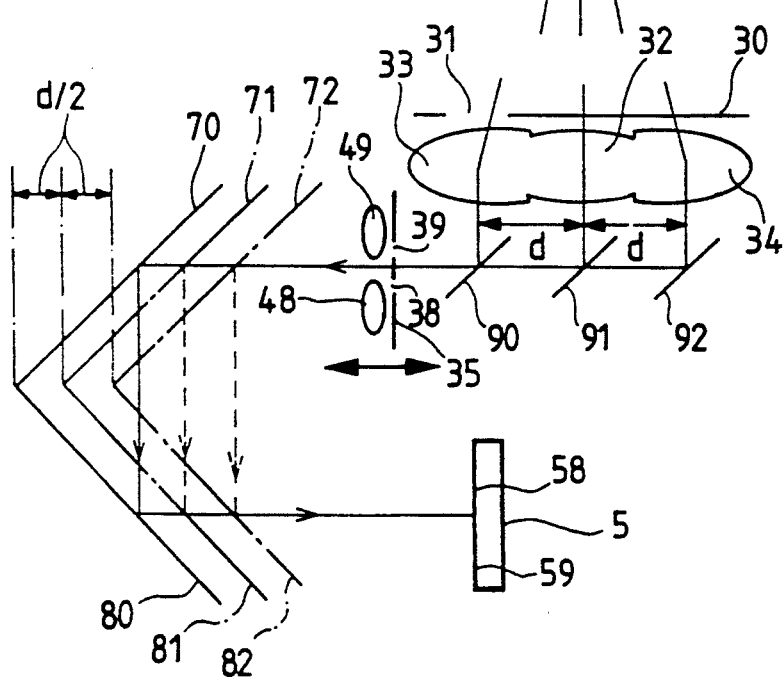
FIG. 16 illustrates a method of changing the focus detecting region.

The selecting portion 9 drives a drive portion 104 to thereby drive the re-imaging lenses 48, 49 and the stop mask 35 (FIGS. 15 and 16), and feeds back the amount of drive by a position detector 109 and controls it to a desired amount of drive.

Figure 25:
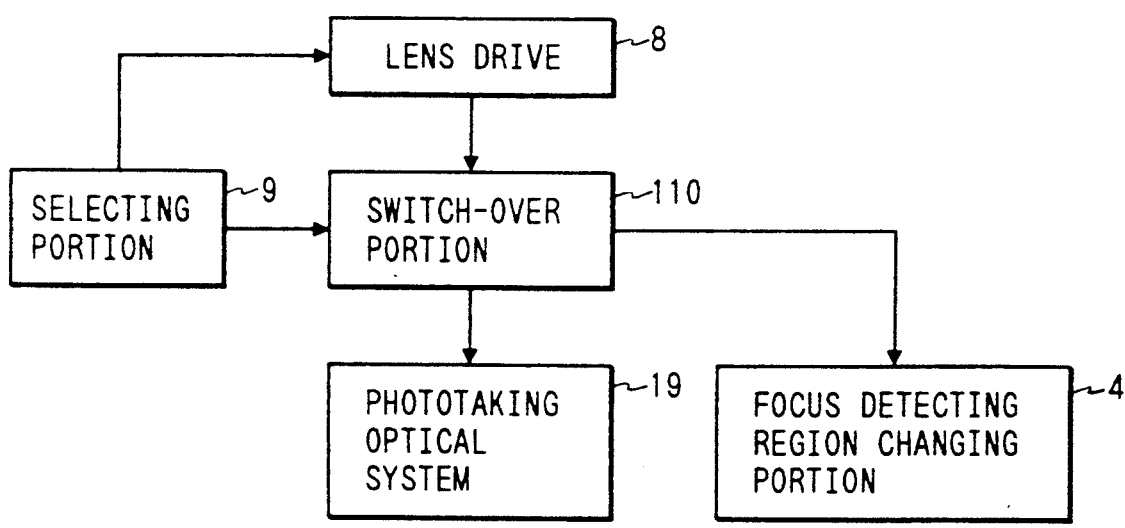
FIG. 25 is a block diagram showing the construction of another embodiment of the present invention.

FIG. 25 is a block diagram when the drive portion 10 is used also as the lens drive portion 8.

During a change of the focus detecting region, the selecting portion 9 changes over a switch-over portion 110 to thereby connect the lens drive portion 8 to the focus detecting region changing portion 4 and control the lens drive portion 8. During usual lens driving, the switch-over portion 110 is changed over to thereby connect the lens drive portion 8 to the phototaking optical system 19, and the drive control portion 7 controls the lens drive portion 8 and effects lens driving.

Usually, lens driving and a change of the focus detecting region need not be effected at a time and therefore, by making the drive portions common, the saving of space and cost is obtained.

<About the Focus Detecting Calculation Portion>

In the focus detecting calculation portion 6, the object image data is subjected to a well-known focus detecting correlation calculation process and the relative positional relation between the pair of secondary images on the sensor 5 in the direction of arrangement of the picture elements of the light receiving portions is detected, whereby the defocus amount of the phototaking optical system 19 can be detected.

<About the Correcting Portion>

In the correcting portion 11, the defocus amount calcualted is corrected in conformity with the position of the focus detecting region selected by the selecting portion 9.

When the defocus amount is defined as d and the defocus amount after corrected is defined as d', there is given the following equation:

$$d' = d + L(n) + M(n) \quad (2)$$

where n represents the position of the focus detecting region, and L(n) is the amount of correction set for each kind of lens or each individual lens when focus detection is effected by the focus detecting apparatus properly regulated at the position n, and is data sent from a memory housed in the interchangeable lens to the correcting portion of the camera body side. This data varies at each zoom position and distance.

Also, M(n) is an amount for correcting the error created by the positional error of the optical block 85 or the like when the focus detecting region is changed, and a value measured during the completion of the assembly of each camera body is memorized in EEPROM.

Figure 26:
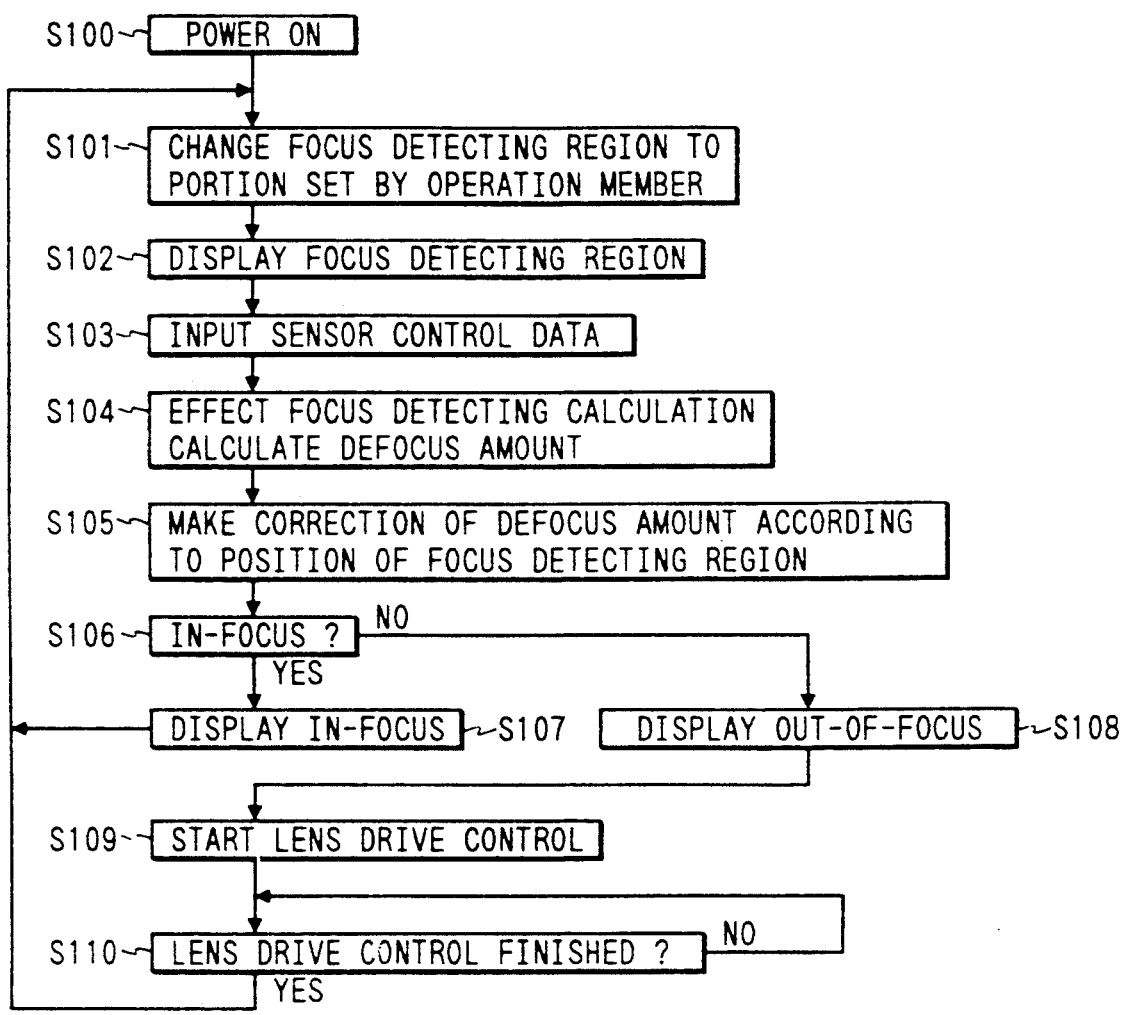
FIG. 26 is a flow chart showing the program when the processing of a focus detecting calculation portion, a drive control portion, a selecting portion and a currecting portion is effected by the software of a microcomputer.

FIG. 26 is a flow chart of the operation when the focus detecting calculation portion 6, the drive control portion 7, the selecting portion 9 and the correcting portion 11 are constructed of the program of a microprocessor.

At a step S100, the main switch, not shown, of the camera is closed, and when the power source is switched on thereby, the execution of this program is started.

At a step S101, the focus detecting region is changed in conformity with the operated position of the operation member 12. At the next step S102, the selected focus detecting region is displayed by the display portion 14. At a step S103, the photoelectric converting operation of the sensor 5 is controlled and sensor data is input. Further at a step S104, focus detecting calculation is effected on the basis of the sensor data to thereby calculate the defocus amount.

At a step S105, the correction of the defocus amount is made in conformity with the position of the focus detecting region. At a step S106, whether the lens is in focus, that is, whether the absolute value of the corrected defocus amount is a predetermined position or below, is discriminated, and if the answer is affirmative, advance is made to a step S107, and if the answer is negative, advance is made to a step S108. At the step S107, the display of the in-focus is effected by the display portion 14 and return is made to the step S101. On the other hand, at the step S108, the display of the out-of-focus is effected by the display portion 14 and advance is made to a step S109.

At the step S109, lens drive control is started on the basis of the corrected defocus amount, and at the next step S110, whether the lens drive control has been finished is discriminated, and if it has been finished, return is made to the step S101.

Figure 27:
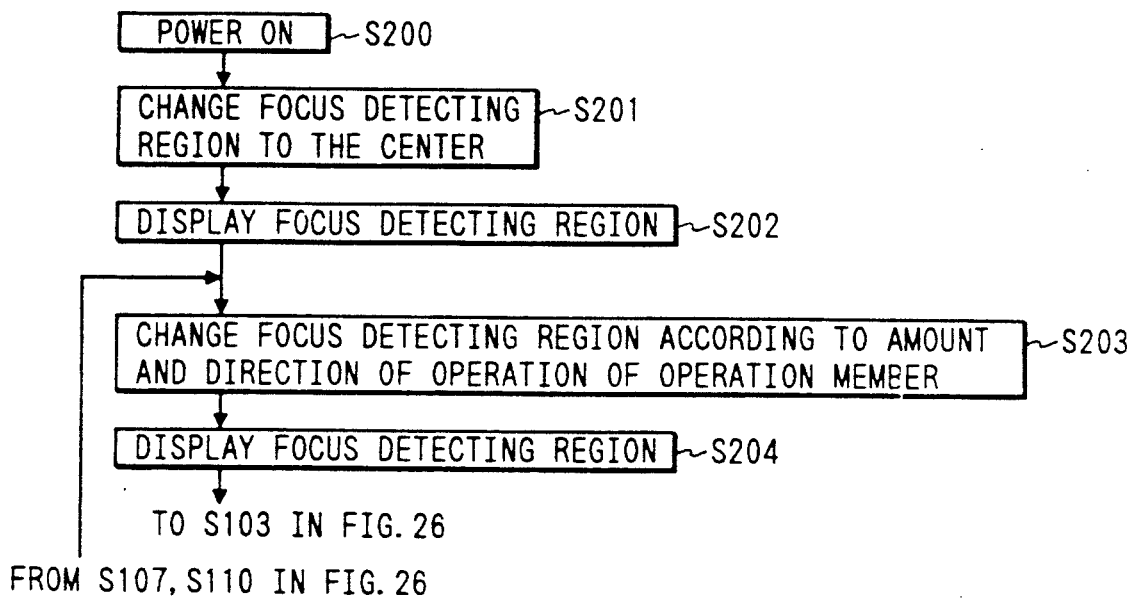
FIG. 27 is a flow chart showing the program when the focus detecting region is changed in conformity with the amount and direction of operation of an operation member.

FIG. 27 is an operation flow chart when a change of the focus detecting region is effected in conformity with the amount and direction of operation of the operation member 12, and in this flow chart, the steps S100-S102 of the program shown in FIG. 26 are changed.

At a step S200, the power source is switched on and advance is made to a step S201, where the focus detecting region is changed with the initial set position of the focus detecting region as the center position of the image field. At the next step S202, the focus detecting region at the center of the image field is displayed by the display portion 14. At a step S203, the amount and direction of operation of the operation member 12 are detected, and in conformity therewith, the focus detecting region is changed. If the operation member 12 is not operated, the focus detecting region is not changed. At a step S204, the changed focus detecting region is displayed by the display portion 14.

Thereafter, a process similar to that in the program shown in FIG. 26 is carried out.

Figure 28:
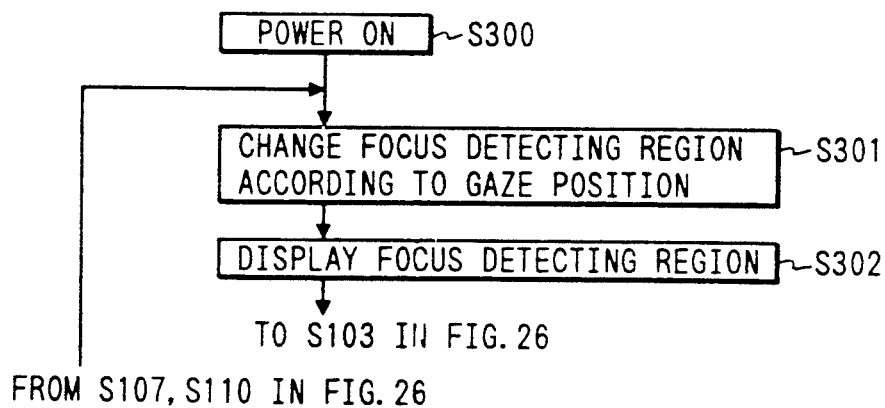
FIG. 28 is a flow chart showing the program when the focus detecting region is changed in conformity with the result of the detection by a visual axis detecting portion.

FIG. 28 is an operation flow chart when a change of the focus detecting region is effected in conformity with the result of the detection by the gaze detection portion 13, and in this flow chart, the steps S100-S102 of the program shown in FIG. 26 are changed.

At a step S300, the power source is switched on and advance is made to a step S301, where change is effected to the focus detecting region nearest to the gaze position on the basis of the result of gaze detection. At the next step S302, the selected focus detecting region is displayed by the display portion 14.

Thereafter, a process similar to that in the program shown in FIG. 26 is carried out.

Figure 29:
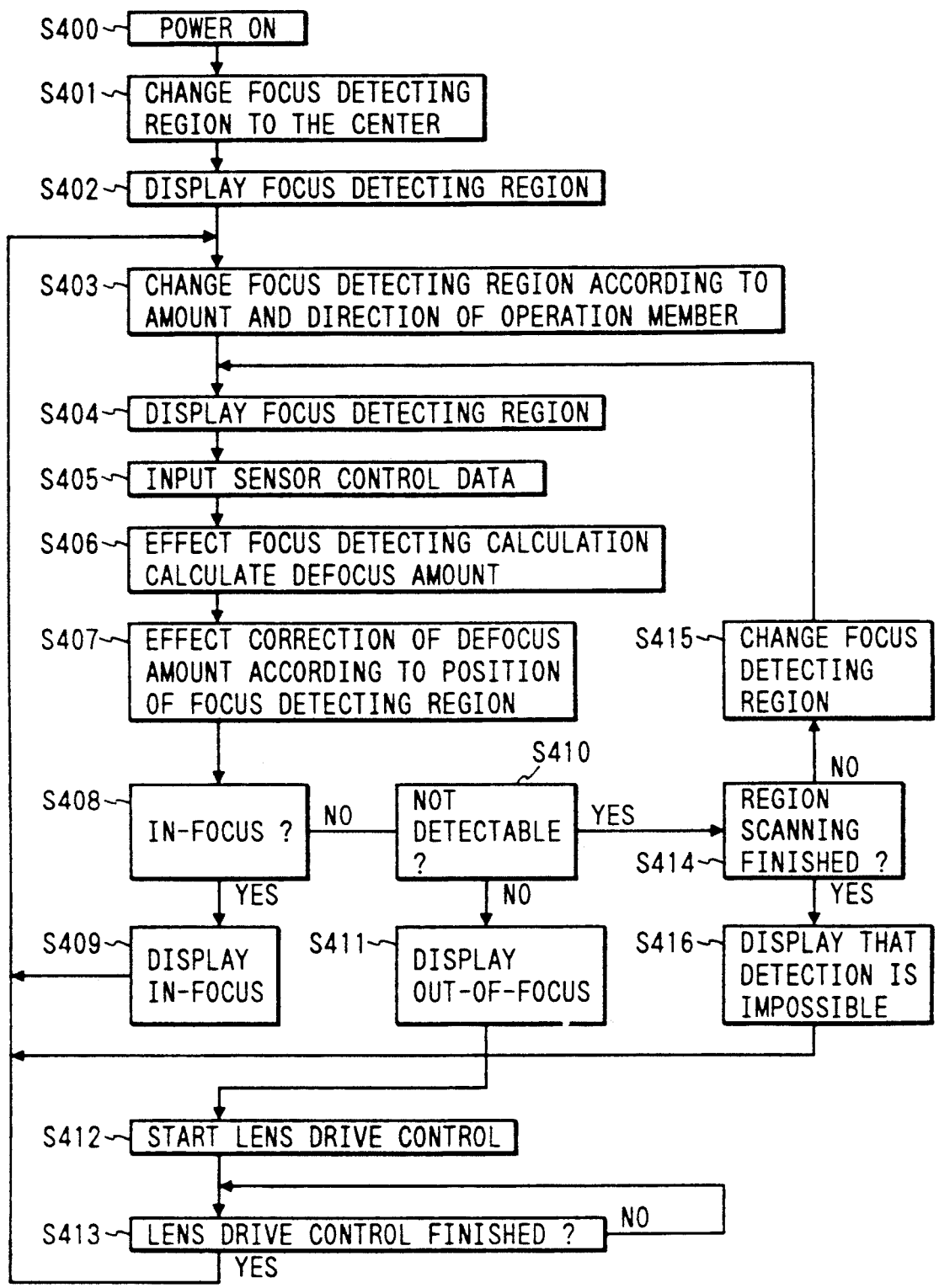
FIG. 29 is a flow chart showing the program when the focus detecting region is changed in conformity with the result of the calculation by the focus detecting calculation portion.

FIG. 29 is an operation flow chart when a change of the focus detecting region is effected in conformity with the result of the detection by the focus detecting calculation portion 6.

At a step S400, the power source is switched on and advance is made to a step S401, where the focus detecting region is changed with the initial set position of the focus detecting region as the center position of the image field. At the next step S402, the focus detecting region at the center of the image field is displayed by the display portion 14. At a step S403, the amount and direction of operation of the operation member 12 are detected and in conformity therewith, the focus detecting region is changed. If the operation member 12 is not operated, the focus detecting region is not changed. At a step S404, the changed focus detecting region is displayed by the display portion 14.

At a step S405, the photoelectric converting operation of the sensor 5 is controlled and sensor data is input. At a step S406, focus detecting calculation is effected on the basis of the sensor data to thereby calculate the defocus amount. At a step S407, the correction of the defocus amount is effected in conformity with the position of the focus detecting region.

At a step S408, whether the lens is in focus, that is, whether the absolute value of the corrected defocus amount is a predetermined position or below, is discriminated, and if the answer is affirmative, advance is made to a step S409, and when the answer is negative, advance is made to a step S410. At the step S409, the display of the in-focus is effected by the display portion 14 and return is made to the step S403. On the other hand, at the step S410, whether focus detection is impossible is discriminated, and if the answer is affirmative, advance is made to a step S414, and if the answer is negative, advance is made to a step S411. At the step S411, the display of the out-of-focus is effected by the display portion 14 and advance is made to a step S412, where lens drive control is started on the basis of the corrected defocus amount.

At a step S413, whether the lens drive control has been finished is discriminated, and if it has been finished, return is made to the step S101.

At the step S414, whether the focus detecting region has been entirely scanned is discriminated, and if the answer is affirmative, advance is made to a step S416, and if the answer is negative, advance is made to a step S415. At the step S415, the focus detecting region is changed. At this time, change is made from a region near the focus detecting region set at first to a region far therefrom. Thereafter, return is made to the step S404.

At the step S416, it is displayed by the display portion 14 that focus detection is impossible, and return is made to the step S403.

By the operation as described above, when focus detection is impossible in the set focus detecting region, the focus detecting regions are automatically changed one after another and focus detection is effected and therefore, if an object image capable of being focus-detected is near the set focus detecting region, focus detection becomes possible and the probability with which focus detection is impossible decreases.

Also, only when focus detection is impossible even if all the focus detecting regions are scanned, it is displayed that focus detection is impossible.

In the construction of the above-described embodiment, the sensor 5 constitutes photoelectric converting means, the focus detecting region changing portion 4 constitutes region changing means, the mirrors 70-72, 80-82 and 90-92 together constitute a deflecting member, the focus detecting calculation portion 6 constitutes calculating means, the support member 50 constitutes holding means, and the correcting portion 11 constitutes correcting means.

As described above, according to the present invention, the region changing means is used in the optical path from the focus detecting region on the predetermined focal plane to the photoelectric converting means to change the focus detecting region.

For example, the deflecting member is moved so that the lengths of the optical paths before and after the change of the region may become equal to each other, to thereby change the region, or a plurality of deflecting members are changed over so that the lengths of the optical paths before and after the change of the region may become equal to each other, to thereby change the region. Further, in response to such movement or change-over of the deflecting members, a part of the focus detecting optical system is moved or changed over.

Design is made such that the light beam from the object passed through the focus detecting region after changed is directed to the photoelectric converting means fixed at a predetermined location and focus detecting calculation is effected on the basis of the output signal of the photoelectric converting means, and this leads to the following advantages:

(1) A focus detecting module comprising a focus detecting optical system and a sensor light receiving portion can be provided for a plurality of focus detecting regions and thus, a focus detecting apparatus of low cost can be provided.

(2) The deflecting member is moved or changed over to thereby change the region and thus, a small space is only required and the downsizing of the apparatus becomes possible.

(3) The positions of the focus detecting regions can be arbitrarily changed and the usability of the apparatus is improved.

(4) Even if the focus detecting region is changed to any position, the position and angle of the focus detecting module with respect to the predetermined focal plane in the direction of the optical axis do not become wrong and therefore, focus detection accuracy is not reduced.

(5) The focus detecting region can be changed to any position in the vertical and horizontal directions of the image field.

(6) The position of the focus detecting region can be greatly changed.

(7) Since the sensor light receiving portion is fixed, there is no possibility of the connecting portion of the sensor light receiving portion coming off or the wiring material being cut.

(8) Since the focus detecting optical system is fixed, the adjustment of the position and angle thereof relative to the phototaking optical system becomes easy.

Also, design is made such that the focus detecting region is changed by the extraneous operation of the operation member or the region is changed on the basis of the result of the detection of the photographer's gaze position or the region is changed when the result of the focus detecting calculation is the impossibility of focus detection and therefore, the operability during the focus detecting operation can be improved.

Further, design is made such that each time the focus detecting region is changed, a focus detection error included in the result of the focus detecting calculation is corrected and therefore, high focus detection accuracy is obtained.

What is claimed is:

1. A focus detecting apparatus characterized by the provision of:

a focus detecting optical system for setting a focus detecting region on the predetermined focal plane of a phototaking optical system, directing a light beam from an object passed through the focus detecting region to photoelectric converting means fixed at a predetermined location, and forming an object image thereon;

region changing means for changing the position of a deflecting member having at least two reflecting surfaces which is installed in the optical path from said focus detecting region to said photoelectric converting means relative to said fixed photoelectric converting means to thereby change the focus detecting region on said predetermined focal plane; and calculating means for calculating the focus adjusted state of said phototaking optical system in the focus detecting region after changed by said region changing means, on the basis of the output signal of said photoelectric converting means.

2. A focus detecting apparatus according to claim 1, characterized in that said region changing means moves said deflecting member so that the length of the optical path from the focus detecting region after changed to said photoelectric converting means may become equal to the length of the optical path from the focus detecting region before changed to said photoelectric converting means, to thereby change the focus detecting region.

3. A focus detecting apparatus according to claim 1, characterized in that said region changing means changes over a plurality of deflecting members so that the length of the optical path from the focus detecting region after changed to said photoelectric converting means may become equal to the length of the optical path from the focus detecting region before changed to said photoelectric converting means, to thereby change the focus detecting region.

4. A focus detecting apparatus according to claim 1, characterized in that said focus detecting optical system is provided with a field mask disposed near said predetermined focal plane of said phototaking optical system and having an opening for setting the focus detecting region on said predetermined focal plane, and a condenser lens disposed near said predetermined focal plane of said phototaking optical system and having a plurality of lens portions corresponding to a plurality of focus detecting regions set on said predetermined focal plane, and said opening in said field mask is moved to a position corresponding to each of said lens portions of said condenser lens in response to the change of the focus detecting region by said region changing means.

5. A focus detecting apparatus according to claim 1, characterized in that said focus detecting optical system is provided with a field mask disposed near said predetermined focal plane of said phototaking optical system and having an opening for setting the focus detecting region on said predetermined focal plane, and a condenser lens disposed near said predetermined focal plane of said phototaking optical system and having a lens portion corresponding to said focus detecting region, and said opening in said field mask and said lens portion of said condenser lens are moved in response to the change of the focus detecting region by said region changing means.

6. A focus detecting apparatus according to claim 1, characterized in that said focus detecting optical system is provided with a field mask disposed near said predetermined focal plane of said phototaking optical system and having a plurality of openings for setting a plurality of focus detecting regions on said predetermined focal plane, and a condenser lens disposed near said predetermined focal plane of said phototaking optical system and having a lens portion corresponding to one of said plurality of focus detecting regions, and said lens portion of said condenser lens is moved in response to the change of the focus detecting region by said region changing means.

7. A focus detecting apparatus according to claim 2, characterized in that said focus detecting optical system is provided with a condenser lens disposed near said predetermined focal plane of said phototaking optical system and having a plurality of lens portions corresponding to a plurality of focus detecting regions set on said predetermined focal plane, a pair of re-imaging lenses for causing the primary image of the object formed on said predetermined focal plane by said phototaking optical system to be reimaged as a secondary image on said photoelectric converting means, and holding means for integrally holding a stop mask disposed near said pair of re-imaging lenses and having a pair of openings, and said region changing means moves said deflecting member along said holding means to thereby change the focus detecting region.

8. A focus detecting apparatus comprising:

a phototaking optical system for forming an object image on a predetermined focal plane;

a sensor fixed at a predetermined location;

a re-imaging optical system for causing a portion of the object image which is to be formed on some area of the predetermined focal plane by a light beam passed through the phototaking optical system to be re-imaged on a predetermined portion of said sensor;

an optical element provided in said re-imaging optical system being moved relative to the fixed sensor to thereby make the position of said some area changeable;

the relative movement of said optical element being effected so that irrespective of said movement, the length of the optical path between said some area and the predetermined portion of said sensor may be kept; and calculating means for calculating the focus state of said some area of said predetermined focal plane on the basis of the output of the predetermined portion of said sensor.

9. A focus detecting apparatus having a display device, comprising:

a phototaking optical system for forming an object image on a predetermined photographing image field;

focus detecting region setting means for setting changeably a position of a focus detecting region for detecting a focus adjusting state of said phototaking optical system on the photographing image field;

an image sensor;

a focus detecting optical system for guiding a light flux coming from said phototaking optical system to the focus detecting region set by said focus detecting region setting means on said image sensor;

calculating means for calculating a focus adjusting state of said phototaking optical system in the focus detecting region set by said focus detecting region setting means on the basis of output from said image sensor;

a finder through which a photographer observes the object image formed by said phototaking optical system on said photographing image field; and display means for displaying in said finder a position of the focus detecting region set by said focus detecting region setting means superimposed with said object image;

said focus detecting region setting means setting changeably the position of the focus detecting region by movement of an optical member disposed between said phototaking optical system and said image sensor.

10. A focus detecting apparatus having a display device, comprising:

a phototaking optical system for forming an object image on a predetermined photographing image field;

focus detecting region setting means for setting changeably a position of a focus detecting region for detecting a focus adjusting state of said phototaking optical system on the photographing image field;

an image sensor;

a focus detecting optical system for guiding onto said image sensor a light flux coming from said phototaking optical system to the focus detecting region set by said focus detecting region setting means;

calculating means for calculating a focus adjusting state of said phototaking optical system in the focus detecting region set by said focus detecting region setting means on the basis of output from said image sensor;

a finder through which a photographer observes the object image formed on said photographing image field by said phototaking optical system; and display means for displaying the focus adjusting state of the focus detecting region set by said focus detecting region setting means in a position corresponding to the focusing region on said finder superimposed with said object image;

said focus detecting region setting means setting changeably the position of the focus detecting region by movement of an optical member disposed between said phototaking optical system and said image sensor.

11. A focus detecting apparatus according to claim 10, wherein said region setting means is able to change continuously the position of the focus detecting region.

12. A focus detecting apparatus, comprising:

a phototaking optical system for forming an object image on a predetermined photographing image field;

focus detecting region setting means for setting changeably a position of a focus detecting region for detecting a focus adjusting state of said phototaking optical system on the photographing image field;

an image sensor;

a focus detecting optical system for guiding onto said image sensor a light flux coming from said phototaking optical system to the focus detecting region set by said focus detecting region setting means;

calculating means for calculating a focus adjusting state of said phototaking optical system in the focus detecting region set by said focus detecting region setting means on the basis of output from said image sensor, and outputting the calculated result as a focus signal; and correction means for correcting said focus signal in accordance with the position of the focus detecting region set by said focus detecting region setting means;

said focus detecting region setting means setting changeably the position of the focus detecting region by movement of an optical member disposed between said phototaking optical system and said image sensor.

13. A focus detecting apparatus according to claim 12, wherein said region setting means is capable of changing continuously the position of the focus detecting region.

14. A focus detecting apparatus according to claim 12, wherein said correcting means corrects a focus detection error included in the result of the calculation by said calculating means each time the focus detecting region is changed by said region changing means.

15. A focus detecting apparatus capable of changing a focus detecting region, comprising:

a phototaking optical system for forming an object image on a predetermined photographing image field;

focus detecting region setting means for setting changeably a position of a focus detecting region for detecting a focus adjusting state of said phototaking optical system on the photographing image field;

an image sensor;

a focus detecting optical system for guiding onto said image sensor a light flux coming from said phototaking optical system to the focus detecting region set by said focus detecting region setting means;

calculating means for calculating a focus adjusting state of said phototaking optical system in the focus detecting region set by said focus detecting region setting means on the basis of output from said image sensor; and eye gaze detecting means for detecting a photographer's gaze position on said photographing image field;

said focus detecting region setting means setting a position of the focus detecting region on the photographing image field by movement of a position corresponding to the gaze position detected by said eye gaze detecting means.

16. A focus detecting apparatus according to claim 15, wherein said region setting means is able to change continuously the position of the focus detecting region.

17. A focus detecting apparatus capable of changing a focus detecting region, comprising:
- a phototaking optical system for forming an object image on a predetermined photographing image field;
- focus detecting region setting means for setting changeably a position of a focus detecting region for detecting a focus adjusting state of said phototaking optical system on the photographing image field;
- an image sensor;
- a focus detecting optical system for guiding onto said image sensor a light flux coming from said phototaking optical system to the focus detecting region set by said focus detecting region setting means;
- calculating means for calculating a focus adjusting state of said phototaking optical system in the focus detecting region set by said focus detecting region setting means on the basis of output from said image sensor; and
- externally operative operating means;
- said focus detecting region setting means setting a position of the focus detecting region on the photographing image field by moving an optical member disposed between said phototaking optical system and said image sensor to a position selected by said operating means.

18. A focus detecting apparatus, comprising:
- a phototaking optical system for forming an object image on a predetermined photographing image field;
- focus detecting region setting means for setting changeably and two dimensionally a position of a focus detecting region for detecting a focus adjusting state of said phototaking optical system on the photographing image field;
- an image sensor;
- a focus detecting optical system for guiding onto said image sensor a light flux coming from said phototaking optical system to the focus detecting region set by said focus detecting region setting means; and
- calculating means for calculating a focus adjusting state of said phototaking optical system in the focus detecting region set by said focus detecting region setting means on the basis of output from said image sensor;
- said focus detecting region setting means setting changeably the position of the focus detecting region by moving two dimensionally an optical member disposed between said phototaking optical system and said image sensor.

19. A focus detecting apparatus according to claim 18, wherein
- said region setting means is capable of changing continuously the position of the focus detecting region.

20. A focus detecting apparatus, comprising:
- a phototaking optical system for forming an object image on a predetermined photographing image field;
- focus detecting region setting means for setting changeably a position of a focus detecting region for detecting a focus adjusting state of said phototaking optical system on the photographing image field;
- an image sensor;
- a focus detecting optical system for guiding onto said image sensor a light flux coming from said phototaking optical system to the focus detecting region set by said focus detecting region setting means; and
- calculating means for calculating a focus adjusting state of said phototaking optical system in the focus detecting region set by said focus detecting region setting means on the basis of output from said image sensor;
- said focus detecting region setting means setting changeably the position of the focus detecting region by moving an optical member disposed between said phototaking optical system and said image sensor, and resetting the focus detecting region in the center of said phototaking of image field when the focus detecting apparatus is turned ON.

21. A focus detecting apparatus according to claim 20, wherein
- said region setting means is capable of changing continuously the position of the focus detecting region.

22. A focus detecting apparatus, comprising:
- a phototaking optical system for forming an object image on a predetermined photographing image field;
- focus detecting region setting means for setting changeably a position of a focus detecting region for detecting a focus adjusting state of said phototaking optical system on the photographing image field;
- an image sensor;
- a focus detecting optical system for guiding onto said image sensor a light flux coming from said phototaking optical system to the focus detecting region set by said focus detecting region setting means;
- calculating means for calculating a focus adjusting state of said phototaking optical system in the focus detecting region set by said focus detecting region setting means on the basis of output from said image sensor and outputting a focus signal;
- an actuator for focus adjusting by moving said phototaking optical system; and
- drive means for driving said actuator based on said focus signal;
- said focus detecting region setting means setting changeably the position of the focus detecting region by moving an optical member disposed between said phototaking optical system and said image sensor with use of said actuator.

23. A focus detecting apparatus according to claim 22, wherein
- said region setting means is capable of changing continuously the position of the focus detecting region.

24. A focus detecting apparatus, comprising:
- a phototaking optical system for forming an object image on a predetermined photographing image field;
- focus detecting region setting means for setting changeably a position of a focus detecting region for detecting a focus adjusting state of said phototaking optical system on the photographing image field;
- an image sensor;
- a focus detecting optical system for guiding onto said image sensor a light flux coming from said phototaking optical system to the focus detecting region set by said focus detecting region setting means; and calculating means for calculating a focus adjusting state of said phototaking optical system in the focus detecting region set by said focus detecting region setting means;

said focus detecting region setting means setting changeably the focus position of the focus detecting region by moving an optical member disposed between said phototaking optical system, and said image sensor, and changing the focus detecting region in a case where detection of the focus adjusting state by said calculating means is not possible.

25. A focus detecting apparatus according to claim 24, wherein said region setting means changes gradually the focus detecting region so that a region where the focus detecting region is changeable may be covered in its entirety in the case where detection of the focus adjusting state by said calculating means is not possible.

26. A focus detecting apparatus according to claim 24, wherein said region setting means is capable of changing continuously the position of the focus detecting region.

* * * * *

UNITED STATES PATENT AND TRADEMARK OFFICE
CERTIFICATE OF CORRECTION

PATENT NO. : 5,311,004
DATED : May 10, 1994
INVENTOR(S) : Yosuke KUSAKA It is certified that error appears in the above-identified patent and that said Letters Patent is hereby corrected as shown below:

On the Title Page: Item [63]

Under the Related U.S. Application Data, "Ser. No. 954,401" should read --Ser. No. 956,401--.

Signed and Sealed this

Fourteenth Day of November, 1995

BRUCE LEHMAN

*Attest:*

*Attesting Officer*  *Commissioner of Patents and Trademarks*